United States Patent [19]
Clancey et al.

[11] Patent Number: 6,134,563
[45] Date of Patent: Oct. 17, 2000

[54] CREATING AND EDITING DOCUMENTS

[75] Inventors: William J. Clancey, Portola Valley; Lee Hecht, Palo Alto; Erich A. Helfert, San Mateo; John Wu, Atherton; Edgar P. Canty, Menlo Park, all of Calif.

[73] Assignee: Modernsoft, Inc., Palo Alto, Calif.

[21] Appl. No.: 08/933,584

[22] Filed: Sep. 19, 1997

[51] Int. Cl.[7] .............................. G06F 12/00; G06F 17/00
[52] U.S. Cl. .............................. 707/503; 707/500; 706/45
[58] Field of Search .................................... 707/500–508, 707/102, 7, 526; 705/26–35, 36–40; 364/468.1; 706/45–56

[56] References Cited

U.S. PATENT DOCUMENTS

| | | | |
|---|---|---|---|
| 5,257,185 | 10/1993 | Farley et al. ....................... | 364/419.19 |
| 5,379,366 | 1/1995 | Noyes ...................................... | 706/55 |
| 5,692,233 | 11/1997 | Garman .................................. | 705/36 |
| 5,701,400 | 12/1997 | Amado .................................... | 395/76 |
| 5,893,087 | 1/1955 | Wlaschin et al. ........................... | 707/3 |

OTHER PUBLICATIONS

Townsend et al., Microsoft Office 6 in 1, Que, pp. 179, 623, and 366, 1994.

*Primary Examiner*—Joseph H. Feild
*Assistant Examiner*—Alford W. Kindred
*Attorney, Agent, or Firm*—Fish & Richardson, P.C.

[57] ABSTRACT

A computer-implemented method of creating and editing a document containing one or more terms. A knowledge base containing a set of terms with one or more predefined properties including part-of properties relating terms to each other is provided. The one or more predefined properties associated with a user-selected term are identified. Constraints are imposed on user manipulation of the document with respect to the user-selected term in accordance with the one or more identified predefined properties associated with the user-selected term. In a particular implementation, a method of creating and editing a financial document containing one or more financial terms is described. The tasks of creating and editing documents are simplified by the separation of the presentation of information contained in a document from underlying representation of calculations and interrelationships. A user may readily manipulate the content and appearance of domain-specific (e.g., financial) analyses, without having repeatedly to define and verify calculations. A user may define and customize standard reports with a simple palette of powerful editing tools that implement and maintain the semantics of the items in a document. This frees the user from having to handle the underlying references directly, allowing the user to focus instead upon concepts and contexts contained within the document.

40 Claims, 19 Drawing Sheets

| Statement | Type | Sub-Type |
|---|---|---|
| Income Statement | Sales<br>Costs<br>Income<br>Dividends<br>Change in Retained Earnings | Gross Sales<br>Discounts<br>Allowances<br>Returns<br>Net Sales |
| Balance Sheet Statement | | |
| Funds Flow Statement | | |
| Ratios Statement | | |

Income Statement

| Project | Time Periods |
|---|---|
| Sales Section<br>  Gross Sales<br>  Discounts<br>  Allowances<br>  Returns<br>  Net Sales<br>Costs Section<br>  Cost of Sales<br>  Gross Profit<br>  Other Costs<br>  Selling General and Admin<br>  R&D<br>  Interest (Income)<br>  Other<br>  Interest Expense Section<br>    EBIT<br>    Net Interest Expense<br>    Pretax (Before Extraordinary)<br>Income Section<br>  Extraordinary Items<br>  Pretax Income<br>  Provision for Income Taxes<br>  Net Income<br>Dividends Section<br>  Preferred Dividends<br>  Income Available for Common Dividends<br>  Common Dividends Section<br>    Common Dividends<br>    Common Dividends per Share<br>    Primary Earnings per Share<br>    Fully Diluted Earnings per Share<br>Change in Retained Earnings | = Gross Sales - (Discounts + Allowances + Returns)<br><br>= Cost of Sales Cash + (Depreciation & Amortization)<br>= Net sales - Cost of Sales<br><br><br><br><br>= Short Term Interest Income Rate * Short term Investments<br><br>= EBIT - Net Interest Expense<br><br>= Pretax Income Before Extraordinary - Extraordinary Items<br>= Pretax Income * Tax Rate<br>= Pretax Income - Provision for Income Taxes<br><br>= Income Available for Common Dividends * Common Dividends Payout Rate<br>= Common Dividends / Common Shares Outstanding<br>= Income Available for Common Dividends / Common Shares Outstanding<br>= Income Available for Common Dividends / Fully Diluted Common Shares<br><br>= Net Income - (Common Dividends + Preferred Dividends) |

CREATING AND EDITING DOCUMENTS

BACKGROUND

The invention relates to creating and editing computer-readable electronic documents, and more particularly to creating and editing domain-specific documents including a report, such as a financial statement.

Reports can be used to summarize, organize, calculate, and analyze data. For example, financial data or sales data can be summarized by one or more financial or sales reports that represent different aspects of the condition or operation of a business entity. To create a financial statement or a sales report, it is often useful to calculate totals, subtotals, averages, counts, or other summaries for different aspects of a business (e.g., total sales for each relevant region, or total sales across regions). Electronic reports are particularly useful because they can be automatically updated when new or different information becomes available. For example, a spreadsheet program such as Microsoft® Excel can be used to create a report in the form of an electronic spreadsheet that consists of a matrix of rows and columns for displaying values and text and for calculating values automatically based upon user-defined formulas. An electronic spreadsheet can also be formatted to vary the presentation of information contained within the report. To simplify the creation of an electronic spreadsheet, a spreadsheet program can automatically enter certain information (e.g., the same information, or an incremental series, such as numerals, ordinals, dates, and months) into a range of cells based upon a user's initial entry of information into one or more cells. A user can also insert a formula into a cell for calculating values on the spreadsheet. Values can be entered directly into a formula, or the values in other cells can be used in a formula by including references to the other cells in the formula. Spreadsheet programs typically include many built-in formulas that can be used alone or in combination with other formulas.

SUMMARY

In one aspect, the invention features a computer-implemented method of creating and editing a document containing one or more terms, comprising: providing a knowledge base containing a set of terms with one or more predefined properties including part-of properties relating terms to each other; identifying the one or more predefined properties associated with a user-selected term; and imposing constraints on user manipulation of the document with respect to the user-selected term in accordance with the one or more identified predefined properties associated with the user-selected term.

The document may be changed in accordance with the one or more properties of the user-selected term in response to a user action calling for a change in the document relating to the user-selected term. A user-selected term from the knowledge base may be inserted into the document. The user-selected term may be a section header, and one or more terms defined by the knowledge base as being part of a section labeled with the section header may be automatically inserted into the document. The user-selected term may be a calculated term, and one or more terms defined by the knowledge base as being needed to derive a value for the calculated term may be automatically inserted into the document. A predefined document comprising one or more sections defined by the knowledge base as being part of the predefined document may be created. The one or more sections may comprise one or more terms defined by the knowledge base as being part of the one or more sections of predefined document. A stored representation of the document may be maintained, including a record of user actions changing one or more properties of terms contained within the document from the definitions of the terms contained in the knowledge base. One or more terms contained within the knowledge base to be selected by a user for entry into the document may be displayed. These terms may include predefined document terms and predefined section terms. The terms that are displayed may be hierarchically arranged wherein, upon selection of a predefined document term, one or more predefined section terms defined by the knowledge base as being part of the predefined document are displayed and, upon selection of a predefined section term, one or more terms defined by the knowledge base as being part of the predefined section are displayed.

In another aspect, the invention features a method of creating and editing a financial document containing one or more final terms, comprising: opening an electronic spreadsheet; providing a financial knowledge base containing a set of financial terms with one or more predefined properties including part-of properties relating financial terms to each other; identifying the one or more predefined properties associated with a user-selected financial term; and imposing constraints on user manipulation of the financial document with respect to the user-selected financial term in accordance with the one or more identified predefined properties associated with the user-selected financial term.

Embodiments may include one or more of the following features.

One or more tools may be provided for manipulating terms contained in the electronic spreadsheet. The consistency of the manipulated terms may be maintained in accordance with the properties associated with the manipulated terms. The financial document may be changed in accordance with the one or more properties of the user-selected financial term in response to a user action calling for a change in the document relating to the user-selected financial term.

A user-selected financial term may be inserted from the financial knowledge base into the spreadsheet. One or more financial terms defined by the financial knowledge base as being related to the user-selected financial term may be automatically inserted into the electronic spreadsheet. The user-selected financial term may be a financial section header and the related financial terms may be defined by the financial knowledge base as being part of a financial section labeled with the financial section header. The user-selected financial term may be a calculated term defined by the financial knowledge base as being associated with a value derived from values associated with the related financial terms. The user-selected calculated term may be converted into an input term that is associated with a value obtained from an input sheet. The input term may be re-converted back into the calculated term defined by the financial knowledge base as being associated with a value derived from values associated with the related financial terms. A property associated with the user-selected term may be changed so that the user-selected term is assigned a value of zero. The user-selected financial term may be a total expression and the related financial terms may be defined by the knowledge base as being inputs to a spreadsheet formula associated with the user-selected financial term for deriving a value for the total expression.

A user-defined alias may be substituted for a predefined financial term name defined in the financial knowledge base, and alias for the inserted financial term may be recorded in response to user action. The user-selected financial term may be duplicated in response to a user action, wherein a user-defined duplicate financial term is inserted into the spreadsheet and the sum of the duplicated financial term and the user-defined duplicate financial term is substituted in spreadsheet equations where the duplicated financial term appeared before being duplicated. The user-selected financial term may be itemized in response to a user action, wherein the user-selected financial term is converted into a total expression associated with a value derived from one or more user-defined financial terms. The one or more user-defined financial terms from which the value associated with the itemized financial is derived may be inserted into the document.

A user may be prevented from deleting certain financial terms from the spreadsheet. A user may be prevented from deleting from the spreadsheet a calculated financial term used in a spreadsheet formula associated with another financial term in the spreadsheet. A user may be prevented from deleting from the spreadsheet an itemized financial term associated with a spreadsheet formula summing together one or more user-defined itemization financial terms in the spreadsheet.

A stored representation of the spreadsheet may be maintained, including a record of user actions changing one or more predefined properties of terms inserted into the spreadsheet for the definitions of the terms contained in the knowledge base. The stored representation of the spreadsheet may be updated in response to a user action deleting a term from the spreadsheet. An itemization count associated with an itemized financial term may be updated in response to a deletion of an itemization of the itemized financial term. A duplicate count associated with a duplicated financial term may be updated in response to a deletion of a duplicate of the duplicated financial term.

A calculated financial term, which has no direct dependents on the spreadsheet, may be deleted in response to a user action, and financial terms referenced in a spreadsheet formula for the deleted calculated term may be automatically deleted. A calculated term, which has no direct dependents the spreadsheet, may be referenced in the spreadsheet formula for the deleted calculated term, and the referenced calculated term and financial terms referenced in a spreadsheet formula for the referenced calculated term may be automatically deleted from the spreadsheet.

A financial term may be characterized as either an input term or a calculated term. A user-requested change in the predefined status property from an input term to a calculated term or from a calculated term to an input term may be recorded.

A second electronic spreadsheet may be opened, and all of the financial terms needed to populate the first spreadsheet with values may be automatically inserted into the second spreadsheet. Financial terms not needed to populate the first spreadsheet may be automatically deleted as a result of user changes to the first spreadsheet. The second spreadsheet may be automatically populated with values obtained from a database.

The spreadsheet may be populated with formulas for deriving values for financial terms contained in the spreadsheet. Predefined formulas for calculated terms may be obtained from the financial knowledge base. User-defined aliases for one or more terms appearing in the spreadsheet may be substituted into the predefined formulas obtained from the financial knowledge base. The properties associated with one or more terms contained within the electronic spreadsheet may be displayed.

In another aspect, the invention features a method of creating and editing a financial document, comprising: opening first and second electronic spreadsheets; inserting into the first spreadsheet one or more financial terms contained in a financial knowledge base defining one or more properties of the financial terms; and inserting into the second spreadsheet all of the financial terms needed to populate the first spreadsheet with values.

Financial terms not needed to populate the first spreadsheet may be deleted from the second spreadsheet as a result of user changes to the first spreadsheet. The second spreadsheet may be automatically populated with values obtained from a database. The first spreadsheet may be populated with formulas for deriving values for financial terms contained in the spreadsheet. Predefined formulas for calculated terms appearing in the first spreadsheet may be obtained from the financial knowledge base.

In yet another aspect, the invention features a method of creating and editing a financial document, comprising: opening an electronic spreadsheet; defining a terms area of the spreadsheet for displaying financial terms; defining a values area of the spreadsheet for displaying values associated with the financial terms; inserting into the terms area of the spreadsheet one or more financial terms in response to one or more user actions; identifying one or more properties associated with financial terms inserted into the terms area as defined in a financial knowledge base containing predefined relationships between financial terms; and populating the values area of the spreadsheet with values in accordance with the identified properties of the financial terms inserted into the terms area of the spreadsheet.

The invention also features a method of creating and editing a financial document, comprising: opening an electronic spreadsheet with an electronic spreadsheet program; providing a financial knowledge base defining relationships between financial terms each having one or more predefined properties; providing a financial document editor comprising an interface between the electronic spreadsheet program and the financial knowledge base; and providing a graphical user interface for receiving user actions and displaying a mockup financial document superimposed on the electronic spreadsheet in response to user actions.

The electronic spreadsheet may be opened with a Microsoft® Excel spreadsheet program. Changes made to the mockup financial document may be recorded. The electronic spreadsheet may be closed. A second electronic spreadsheet may be opened. The mockup financial document may be superimposed on the second electronic spreadsheet based upon the record of changes to the mockup financial document. The mockup financial statement superimposed on the second electronic spreadsheet may be changed in accordance with the financial term properties and relationships defined in the financial knowledge base.

In another aspect, the invention features a method of creating and editing financial documents, comprising: opening a workbook comprising one or more electronic spreadsheets; providing a financial knowledge base containing financial terms with predefined properties; inserting into the workbook two instances of a financial term from the financial knowledge base; and maintaining semantic consistency of the financial term inserted into the workbook.

Semantic consistency may be maintained by creating a reference from one instance of the financial term to the other instance of the financial term. The workbook may comprise a first and a second electronic spreadsheet, and one instance of the financial term may be inserted into the first electronic spreadsheet and the other instance of the financial term may be inserted into any of the electronic spreadsheets of the workbook. A financial term inserted into the first electronic spreadsheet may be duplicated in response to a user action, wherein a user-defined duplicate financial term is inserted into the first electronic spreadsheet. Semantic consistency may be maintained by substituting the sum of the duplicated financial term and the user-defined duplicate financial term in spreadsheet equations where the duplicated financial term appeared on the first and second electronic spreadsheets before being duplicated. A financial term inserted into the first electronic spreadsheet may be itemized in response to a user action and one or more user-defined itemizations of the itemized term may be inserted into the electronic spreadsheet, wherein the user-selected financial term is converted into a total expression with a value derived from the sum of the one or more user-defined itemizations. Semantic consistency may be maintained by substituting the sum of the one or more user-defined itemizations of the itemized term in spreadsheet equations when the itemized financial term appeared on the first and second electronic spreadsheets before being itemized. The first and second electronic spreadsheets may contain a calculated term having a value derived from a formula defined in the financial knowledge base, and semantic consistency is maintained by: inserting into the first electronic spreadsheet the formula for the calculated term to derive the value for the calculated term; and inserting into any of the electronic spreadsheets of the workbook a reference to the value derived for the calculated term on the first electronic spreadsheet.

The invention may be implemented as one or more computer programs, program modules, and computer-readable data that are stored on computer-readable media and that have instructions for causing a processor to perform the actions described.

Among the advantages of the invention are the following. The tasks of creating and editing documents are simplified by the separation of the presentation of information contained in a document from underlying representation of calculations and interrelationships. A user may readily manipulate the content and appearance of domain-specific (e.g., financial) analyses, without having repeatedly to define and verify calculations. A user may define and customize standard reports with a simple palette of powerful editing tools that implement and maintain the semantics of the items in a document. This frees the user from having to handle the underlying references directly, allowing the user to focus instead upon concepts and contexts contained within the document. For financial reports, a component library of standard financial concepts and definitions—including definitions of financial statements, terms, formulas, and projection operations—allows users to manipulate the content and appearance of financial analyses without repeatedly having to define and verify calculations. An input sheet on which input terms are collected provides a highly-useful perspective from which a user may view the data obtained from a database and perform what-if analyses. The input sheet simplifies creation and maintenance of a report using information from a database. The input sheet also provides a user-friendly interface with one more data warehouses.

Other features and advantages will become apparent from the following description, including the claims.

BRIEF DESCRIPTION OF THE DRAWINGS

FIG. 3C is a diagrammatic view of a three-pane browser for viewing terms defined in a financial dictionary.

FIG. 4 is a diagrammatic view of the section headings and associated terms appearing in an income statement.

DETAILED DESCRIPTION

Figure 1:
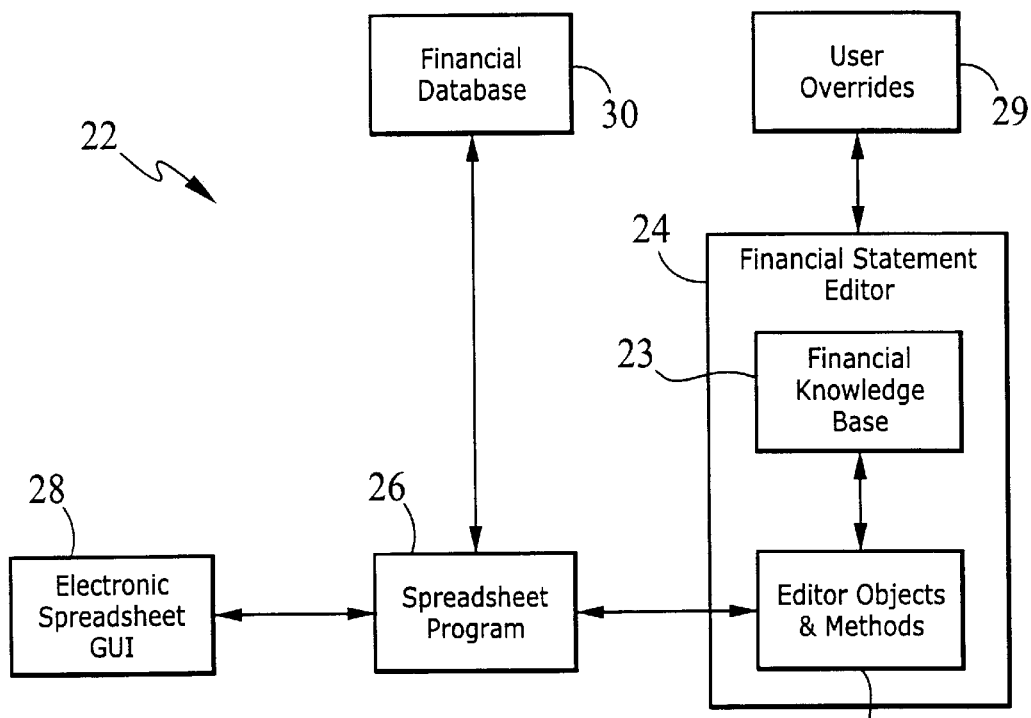
FIG. 1 is a block diagram of a system for creating and editing a financial statement.

Referring to FIG. 1, a system 22 for creating and editing a financial statement report is implemented as a group of computer programs, program modules, and computer-readable data that are stored on computer-readable media and that operate to cause a computer to perform the actions described in this specification. System 22 includes a financial statement editor 24 that has a financial knowledge base 23 and editor objects and methods 25. The financial knowledge base 23 includes a financial dictionary of terms representing financial concepts with predefined properties and interrelationships. The editor objects and methods 25 control the operation of an electronic spreadsheet program 26 in response to user actions directed to the editor objects and methods 25 through a user interface 28, such as a graphical user interface operated under control of system 22. Statement editor 24 embodies and manifests a general financial model of possible contexts, parameters and values, as well as hierarchies and rules relating them. A user may provide overrides 29 to change one or more aspects of financial statement editor 24. In operation, system 22 separates the presentation of financial data and analyses from the underlying data and numeric calculations. Using system 22, a user indicates the financial model elements to be contained within a financial statement. In response, system 22 manages the conceptual and numeric relationships among the selected elements, indicates what information is needed to produce the statement—which information may be entered by hand or acquired under program control from computer-readable source such as a financial database 30—and ensures that this information is used and calculated consistently within one or more financial statements. Information in database 30 might be stored in the form of an electronic spreadsheet, a relational database, or some other electronic form.

In the particular embodiment being described, system 22 is implemented as a computer program running on a personal computer. Spreadsheet program 26 is the Microsoft® Office 97 version of Excel ("Excel"). Financial statement editor 24 is implemented as an add-in to Excel and includes an object-oriented program module that is written in the Microsoft® Visual Basic® for Applications programming language (version 5.0). In particular, financial statement editor 24 includes a financial knowledge base 23; maintenance routines for verifying and organizing financial knowledge base 23; and editing objects and methods 25. The financial knowledge base 23 includes definitions of financial terms representing financial concepts. Editing objects and methods 25 set up menus and tool bars, open and manipulate a project workbook, provide dialogue sheets, provide a browser for displaying the contents of financial knowledge base 23, represent the contents of one or more financial statements, and carry out editing functions. In this particular implementation, editor objects and methods 25 invoke Excel objects and methods. Editor objects and methods 25 also access financial knowledge base 23 to provide editing menus and editing tools. Editor objects and methods 25 may be invoked when a user applies one of the editing tools, as described below. In this embodiment, financial database 30 is in the form of an electronic Excel spreadsheet. User interface 28 provides an Excel spreadsheet and other user interface elements that are displayed on a computer display device (such as a monitor or liquid crystal display screen). User interface 28 responds to user actions such as typing keys on a computer keyboard, moving a mouse or other pointing device to move a cursor across the computer display, or activating a computer mouse button. System 22 stores in computer memory a project workbook representing a financial project. A project workbook contains one or more financial statements, an input sheet (which is a financial statement spreadsheet used for collect input values), a hidden status spreadsheet, saved objects corresponding to financial statements, and macros for initializing links to spreadsheet program 26 and for saving the financial statement objects when the corresponding Excel spreadsheets are opened and closed.

Figure 2:
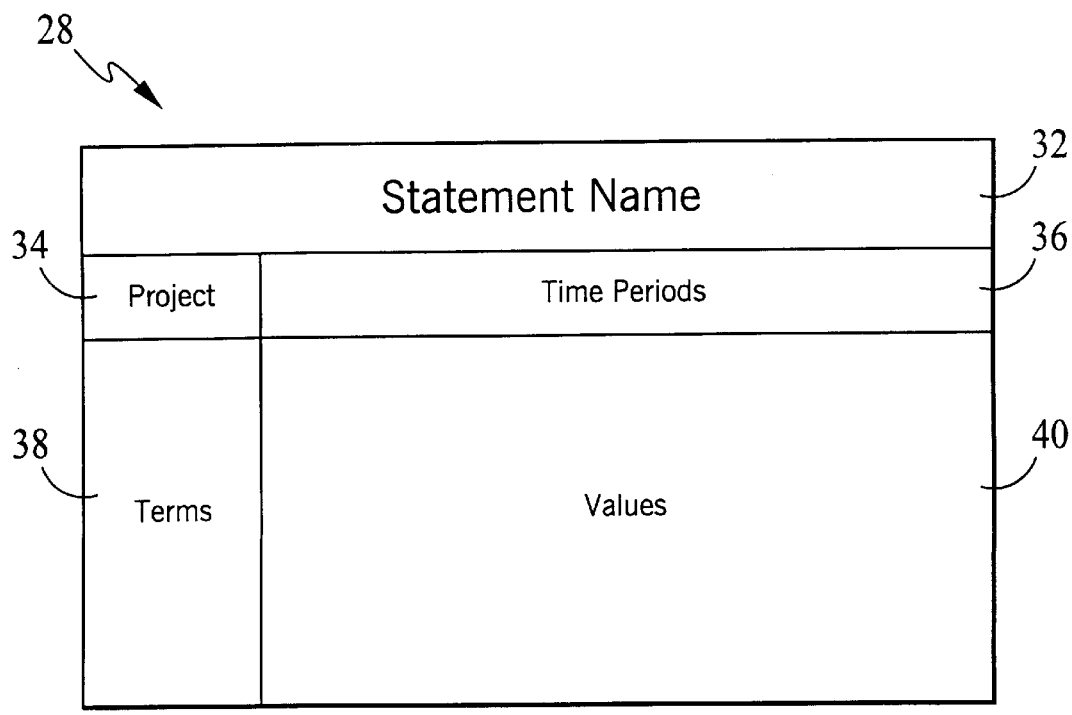
FIG. 2 is a diagrammatic view of a financial statement as displayed to a user.

As shown in FIG. 2, user interface 28 displays a mockup financial statement. The financial statement spreadsheet is referred to as a "mockup" because it is being created and edited. The mockup shows the current appearance of the financial statement so that a user can readily see how an editing operation changes the appearance of the financial statement. User interface 28 shows a statement name area 32 that identifies the kind of statement being represented, a project name area 34 that identifies the name of the project in which the financial statement is contained, a time periods area 36 that identifies the time periods covered by the financial statement, a user-modifiable terms area 38 that represents financial concepts contained within the financial statement, and a values area 40 that can be automatically populated with spreadsheet formulas and/or values corresponding to the associated financial terms. The values in values area 40 are copied from an input statement (described below) which obtains values from the user, from database 30, or from both of these sources. Financial statement editor 24 prevents a user from editing cells within values area 40 that are automatically populated with spreadsheet formulas and/or values. A user can, however, create additional rows and columns that can incorporate calculations and data contained within other spreadsheet cells.

Figure 2A:
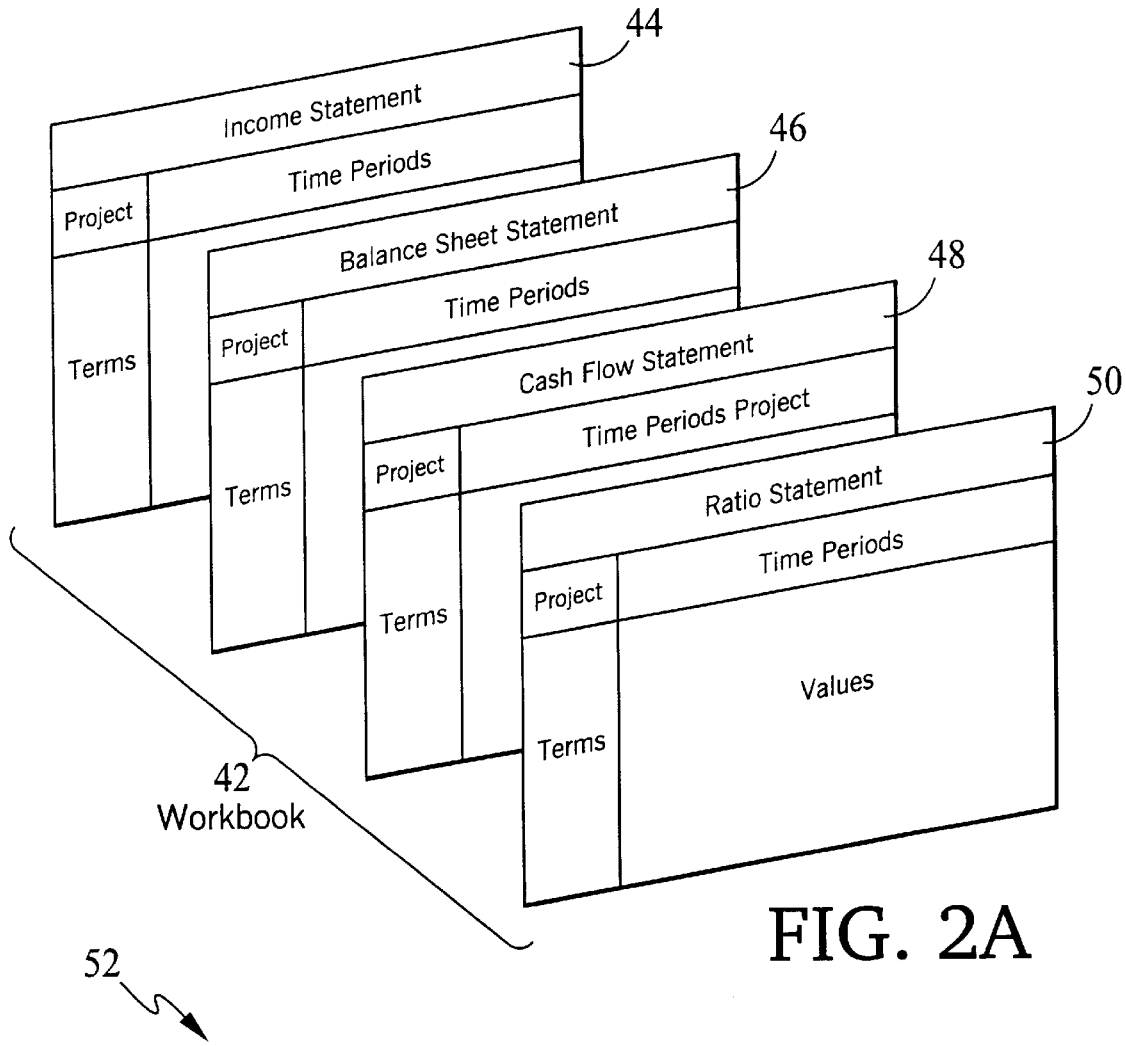
FIG. 2A is a diagrammatic view of an example of a financial workbook, which includes an income statement, a balance sheet statement, a cash flow statement, and a ratio statement.
Figure 2B:
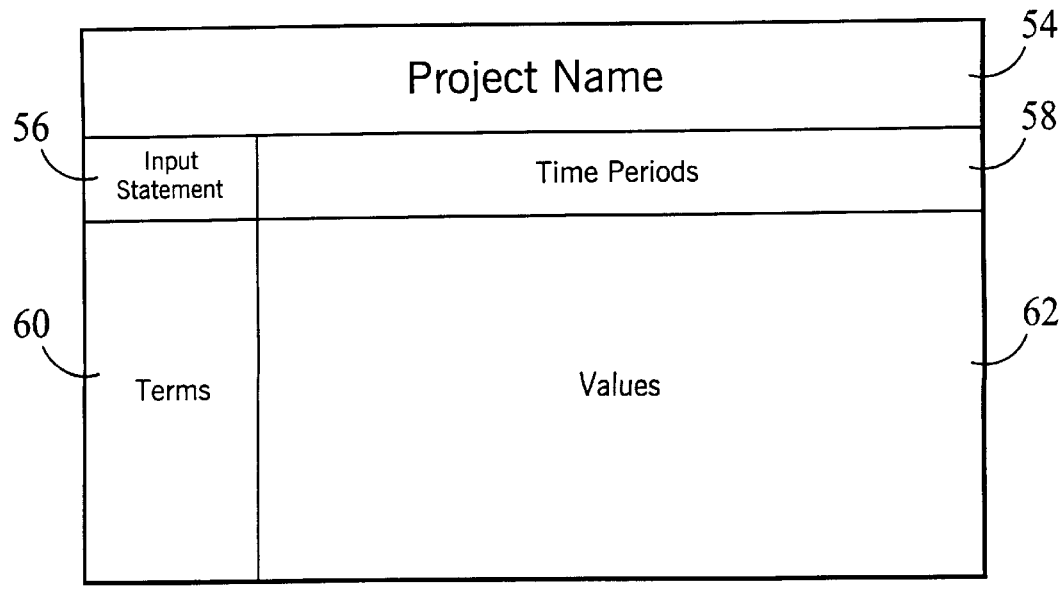
FIG. 2B is a diagrammatic view of an input statement for the financial workbook of FIG. 2A.

Referring to FIGS. 2A and 2B, a computer-readable project workbook 42 includes one or more user-specified financial statements, such as an income statement 44, a balance sheet statement 46, a cash flow statement 48, and a ratio statement 50, each representing a different aspect of a financial project over the selected time range. Project workbook 42 may also include a customized financial statement containing one or more user-selected financial sections and terms. After a user has specified the contents of any of the financial statements in workbook 42, system 22 automatically generates an input statement spreadsheet 52 which identifies all of the information (inputs) needed to populate the financial statements with formulas and values. Input statement 52 includes a project name area 54, an area 56 that identifies the statement as an input statement, an area 58 that contains the time periods covered by the financial statements of project workbook 42, a terms area 60, and an inputs (values) area 62. Some of the terms contained in terms area 60 may not be displayed in any of the financial statements but are needed to calculate the values associated with the terms that actually appear on one or more of the financial statements in workbook 42. Input statement 52 contains only those inputs (and associated terms) needed to populate the financial statements of workbook 42; any input that is not needed is automatically removed from input statement 52 when the input statement is updated. Input values appearing on input statement 52 are color-coded to identify the source or other properties of the input values: values copied from database 30 are displayed in blue, user-supplied values that override database values are displayed in magenta, and user-supplied values that do not override database values are displayed in green.

Figure 3:
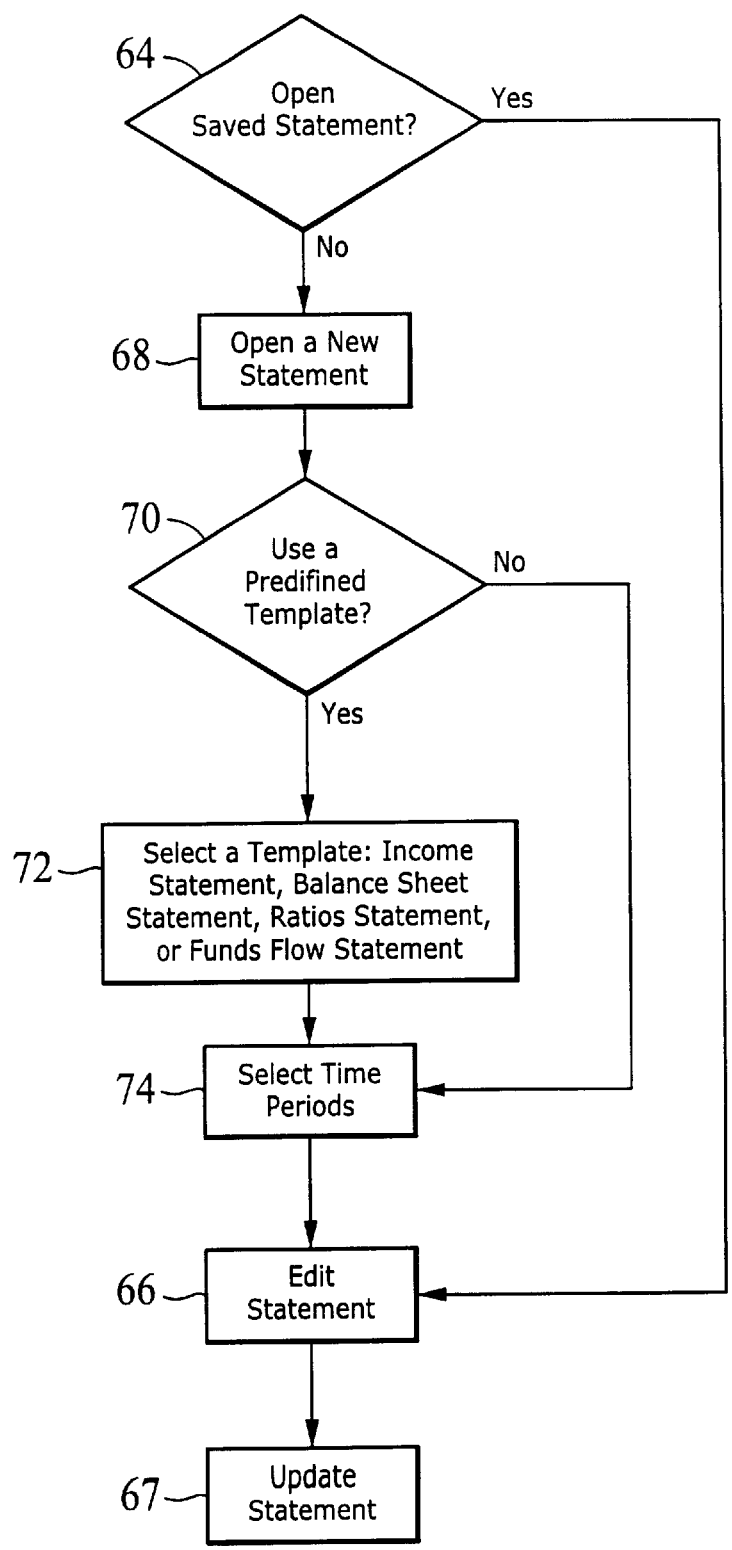
FIG. 3 is a flow diagram of a method by which a user operates the system of FIG. 1 to create and edit a financial statement.

Referring to FIG. 3, a user may open a previously-created project workbook that was saved in a computer memory such as a disk (step 64). The user may then edit the one or more statements in the project, as described in detail below (step 66). Alternatively, a user may create a new project (step 68). The user may then create a new statement based upon a financial statement template containing financial concepts arranged in a predefined format, or the user may open an empty statement (step 70). For example, the user may select a template for an income statement, a balance sheet statement, a ratio statement, or a cash flow statement (step 72). After selecting a template, the user may specify the time range and time periods to be displayed in the financial statement (step 74). The time periods of the mockup financial statement are represented as a finTime_Styles object in financial statement editor 24. The user may then edit the financial statement with one or more financial statement editing tools (step 66). If the user does not select a financial statement template, the user may create a customized financial statement by specifying the time range and time periods to be displayed in the financial statement (step 74) and by creating and editing the financial statement with one or more financial statement editing tools (step 66). The user may insert financial terms in the terms area of the mockup financial statement one at a time, or the user may insert an entire financial section into the mockup financial statement. In order to populate the mockup financial statement with data, the user selects an UPDATE editing tool (described below) or selects the spreadsheet tab which corresponds to the input statement at the bottom of the project workbook interface window (step 67). System 22 creates (or updates) input statement 52 with all of the required input terms, populates input spreadsheet 52 with data from financial database 30 (if supplied), and inserts formulas that refer to this data in the mockup financial statement.

Figure 3A:
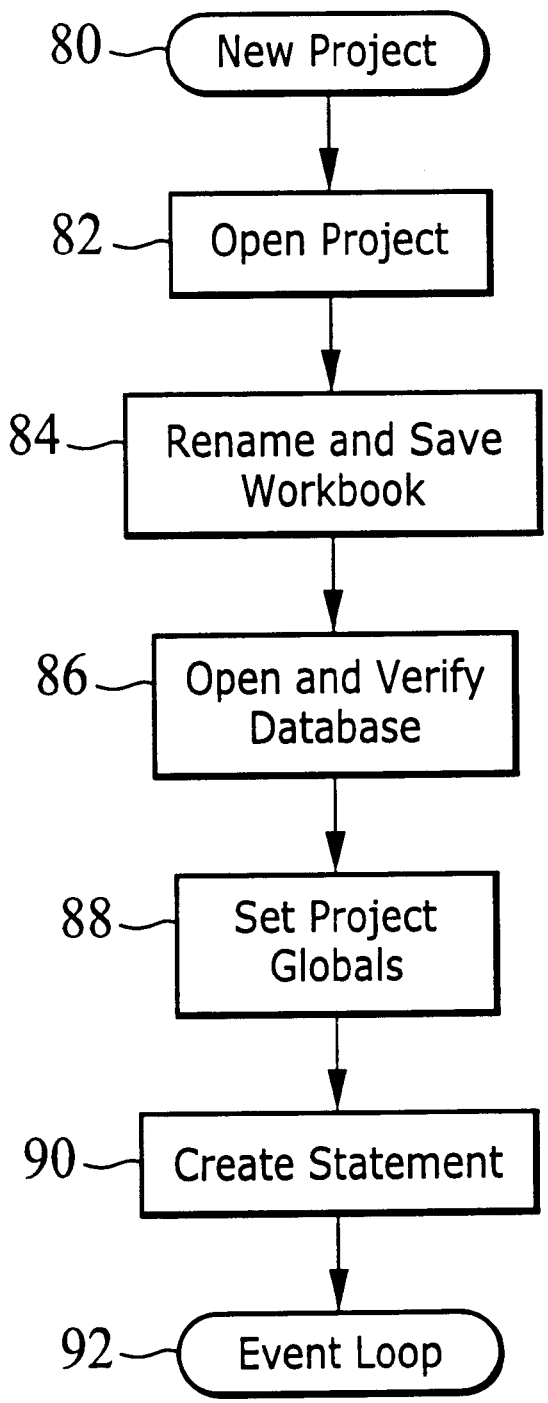
FIG. 3A is a flow diagram of an initialization method used in creating and editing a financial statement.

Referring to FIG. 3A, in response to a user's command to create a new financial statement or project (step 68; FIG. 3), system 22 initiates a new project as follows (step 80). System 22 opens a template project workbook that contains one or more Excel spreadsheets (step 82). System 22 renames and saves the workbook in a memory device, such as a computer hard disk (step 84). System 22 opens and verifies the format of financial database 30 (step 86). System 22 sets the globals for the project (step 88). System 22 then creates a new financial statement (step 90). Once the financial statement has been created, system 22 returns control to an event loop and responds to subsequent user actions (step 92).

Figure 3B:
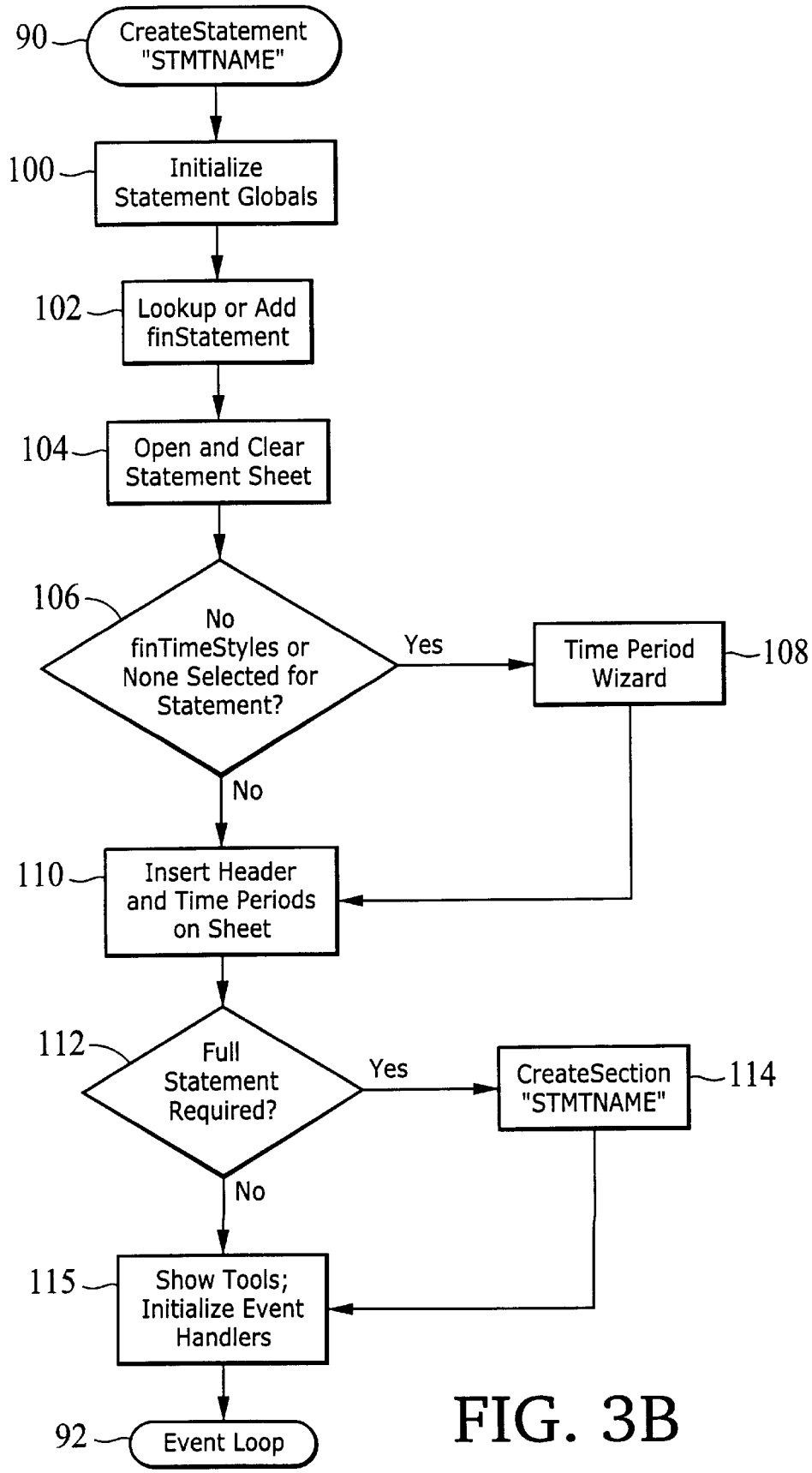
FIG. 3B is a flow diagram of a method of creating a new financial statement.

Referring to FIGS. 3B and 3C, after a user has directed system 22 to create a statement, the user is prompted to supply the name of the statement ("STMTNAME"). System 22 then initializes statement globals (step 100). If the requested statement name corresponds to a previously saved statement, system 22 obtains from the project workbook an object (of type finStatement) which contains all of the information needed to reproduce the saved mockup financial statement (spreadsheet) and enable a user to modify the statement with the financial statement editing tools of system 22; otherwise, system 22 creates a new object (of type finStatement) for a new mockup financial statement (step 102). System 22 then opens and clears the mockup financial statement (step 104). If the time periods to be displayed in the financial statement have not been specified (step 106), system 22 invokes a time period wizard to prompt the user to supply the time periods to be displayed in the financial statement (step 108). System 22 enters a header (namely, the statement name and project name) and the specified time periods into the mockup financial statement, as shown in FIG. 2 (step 110). System 22 displays on the computer display device a three-pane financial browser 111 (FIG. 3C). The user can interact with the browser to insert into a mockup financial statement a fill financial statement, a full financial statement section, or an individual financial term. The full financial statement may be selected from a list shown in the left pane of the browser, which list may include an income statement, a balance sheet statement, a cash flow statement, or a ratio statement. A full financial statement section may be selected from a list shown in the center pane of the browser as a type of a selected full statement. An individual financial term may be selected from a list shown in the right pane of the browser as a subtype of a selected section type. A financial term may be, for example, a ratio expression, a total expression, a net expression, another compound expression, or an arithmetic expression of a specified type, such as sales, costs, income, dividends, change in retained earnings, and other types. In effect, financial browser 111 provides a three-pane hierarchical display that shows subtypes and subparts of the conceptual graph of properties stored as a table in a KBProps spreadsheet, which is described later. If the user selects a predefined, full financial statement (step 112), system 22 automatically populates the mockup financial statement with the section headings and financial terms for the selected statement according to its definition (step 114). System 22 displays a palette or menu of spreadsheet editing tools, initializes event handlers, unlocks the first column of the mockup financial statement (corresponding to financial terms area 38 in FIG. 2), and protects the mockup financial statement so that a user cannot directly edit name area 32, project name area 34, time periods area 36, or values area 40 (step 115). These areas may later be edited when the user applies to a selected area one or more of the editing tools described below. System 22 then returns control to the event loop and responds to subsequent user actions (step 92).

A financial statement generally has one or more financial sections, each having one or more associated financial terms. For example, income statement 44, shown in FIG. 4, was created based on a predefined income statement template in financial statement editor 24, and includes a sales section 116, a costs section 118, an income section 120, a dividends section 122, and a change in retained earnings section 124. Each of these sections includes one or more financial terms. For example, sales section 116 includes a gross sales term 126, a discounts term 128, an allowances term 130, a returns term 132, and a net sales term 134. Each term is characterized as either an input term or a calculated term. Input terms (e.g., gross sales term 126) have values that are obtained from financial database 30 or are input directly by a user. Calculated terms (e.g., net sales term 134) have values that are derived from spreadsheet formulas. For example, net sales term 134 has a value that is derived from the following spreadsheet formula:

$$\text{net sales} = \text{gross sales} - (\text{discounts} + \text{allowances} + \text{returns}).$$

The value associated with net sales term 134 therefore depends upon the values for gross sales term 126, discounts term 128, allowances term 130, and returns term 132, each of which will be referred to as a "direct predecessor" of net sales term 134. Gross profit term 136 has a value that is derived from a spreadsheet formula 135 that includes two direct predecessors which are calculated terms (net sales and cost of sales); the terms from which values are obtained for direct predecessor calculated terms (e.g., net sales and cost of sales) will be referred to simply as "predecessors" of the original calculated term (e.g., gross profit term 136). Thus, net sales term 134 and cost of sales term 137 are direct predecessors of gross profit term 136. Gross sales term 126, discounts term 128, allowances term 130, returns term 134, cost of sales cash term 138 and depreciation & amortization term 140 are predecessors of gross profit term 136. Conversely, net sales term 134 is a "direct dependent" of gross sales term 126, discounts term 128, allowances term 130, and returns term 134.

Financial knowledge base 23 is stored as a matrix of terms and associated relations, which define a conceptual graph. This matrix is conveniently stored in an electronic spreadsheet called KBProps (reproduced in the attached Appendix) that is accessed by finObjects modules routines. Each term (referred to as a KBATOM) in financial knowledge base 23 is characterized by the following relations: ISA, PNAME, PARTOF, SUBPARTS, ACTUAL-FORMAT, NAME-FORMAT, LINE-FORMAT, and SECTION-HEADER. For example, net sales term 134 is characterized as follows:

| Definition of Net Sales Term | |
|---|---|
| KBATOM | Net_Sales |
| ISA | Net_Expression |
| PNAME | Net Sales |
| PARTOF | Sales_Section |
| ACTUAL-FORMULA | Gross_Sales − (Discounts + Allowances + Returns) |
| NAME-FORMAT | Null |
| LINE-FORMAT | Gray Shade |

Figure 5:
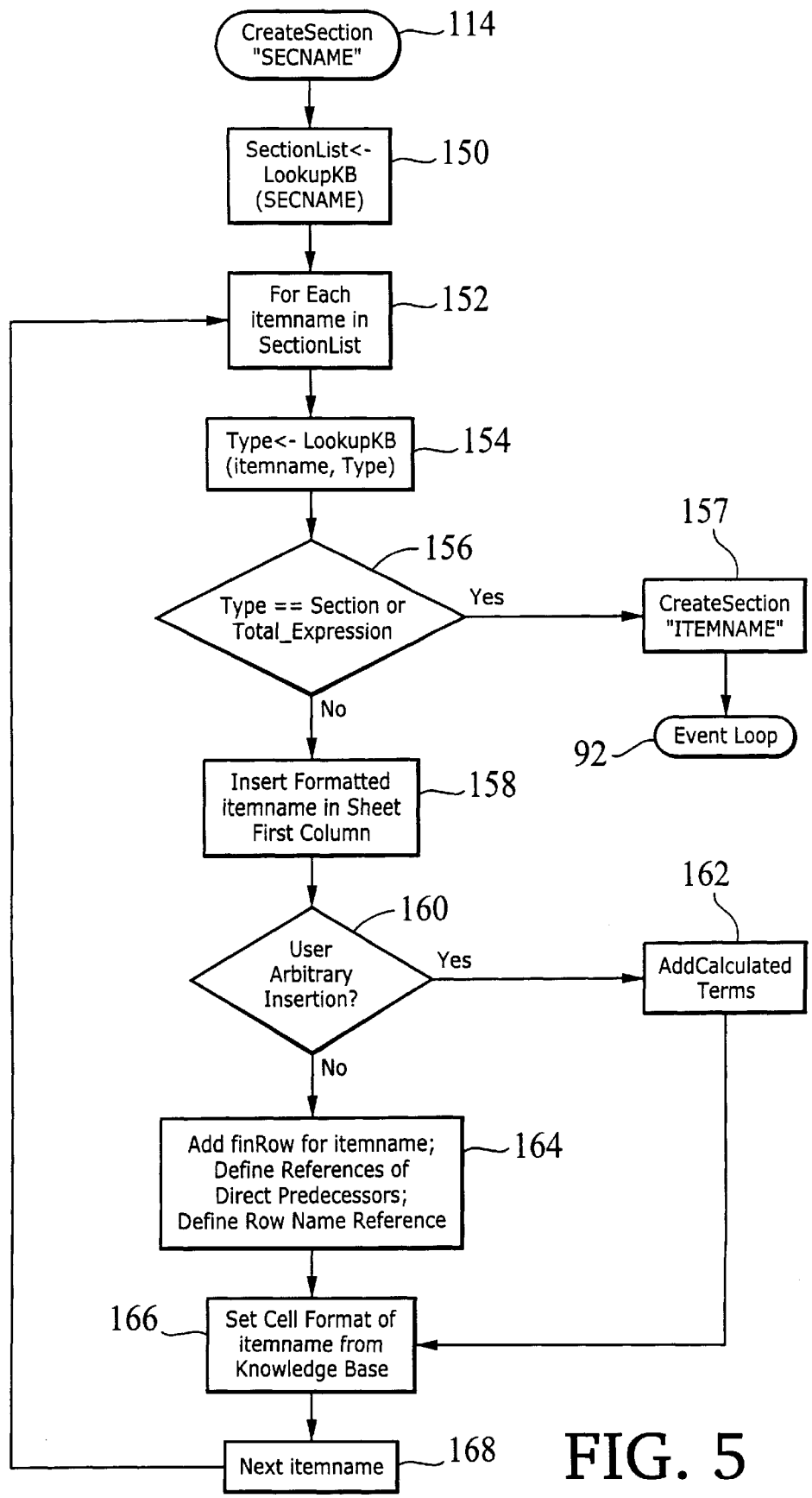
FIG. 5 is a flow diagram of a method of creating a section in a financial statement.

Referring to FIG. 5, system 22 automatically populates the mockup financial statement (FIG. 2) with financial terms corresponding to a financial statement heading (called a SecName in KBProps) as follows (step 114). System 22 invokes a lookupKB module to obtain from financial knowledge base 23 a SectionList, which is a list of one or more financial terms to enter into terms column 38 based upon the SecName (step 150). For each term (called an itemname) in the SectionList, system 22 performs the following steps (step 152). System 22 determines the type of the term from the ISA relation for the term (step 154). If the term is a section or a total expression (step 156), system 22 recursively invokes step 114 to create a section or a total expression associated with the term (step 157); otherwise, system 22 adds the term to terms column 38 (SheetFirstColumn) of the mockup financial statement spreadsheet (step 158). If the term was added by the user (step 160), system 22 automatically populates terms section 38 with any calculated terms used by the spreadsheet formula associated with the user-added term (step 162); otherwise, system 22 stores the properties of the term as a finRow object in an electronic spreadsheet that corresponds to a finStatement object (discussed in the following section). The finRow object includes references of direct predecessors and a row name reference (step 164). System 22 sets the format for the cell in which the term was added based on a predefined or default format specified to financial statement editor 24 (step 166). System 22 then returns to step 122 for the next itemname in the SectionList and repeats the above process (step 168).

Internal Data Structures

As mentioned above, a mockup financial statement is represented to a user as an electronic spreadsheet on a computer display device. System 22 also maintains an internal parallel representation of the financial statement in the form of a finStatement object that includes a finRows object and a finColumns object which respectively correspond to the terms and time periods in the mockup financial statement. A finStatement object has the following properties:

| finStatement Properties | Type | Description |
|---|---|---|
| Name | String | Name of spreadsheet where statement appears |
| finRows() | finRow | |
| numRows | Integer | Number of rows in this statement |
| finColumns() | finColumn | |
| numColumns | Integer | Number of columns in this statement |
| IsINPUTSheet | Boolean | True if this is the input sheet |
| TimePeriodRange | Range | Row corresponding to the time period labels |
| TimeStyleSelected | Integer | Index of selected time style for this |

A finRows object has the following properties:

| finRow Properties | Type | Description |
|---|---|---|
| Name | String | Built-in financial term in knowledge base |
| Alias | String | User's name for this term |
| ChangedStyle | Boolean | User changed the dictionary-defined formatting style of the name or the line |
| DuplicateOf | String | Existing term user duplicated to create this row |
| NumDuplicates | Integer | Number of duplicates user has created of this existing term |
| DuplicateCode | Integer | Unique identifier for this duplicate |
| ItemizationOf | String | User has itemized this existing term |
| ItemizationCode | String | Unique identifier for this itemization |
| NumItemizations | Integer | Number of itemizations user has created of this term |
| Hidden | Boolean | This row is currently hidden in the currently displayed statement |
| UserDefinedInput | Boolean | User converted this to an input (by editing mockup financial statement) |
| AssumeZero | Boolean | User wants to assume values are zero |
| DependentMadeInput | Boolean | User made parent an input and hid this predecessor |
| HistDataSource | Integer | Source of historical data (e.g., user database) |
| HeaderOf | String | This row is a header for the indicated section |
| Calculated | Boolean | Term is calculated (not an input) according to dictionary definition |
| Format | Integer | Current Style of name (e.g., bold, italic) and line shading, spacing |
| Parent | String | finStatement name |
| directPredecessors() | String | Terms directly referenced in this item's formulas |
| NumDirectPredecessors | Integer | Number of direct predecessors |
| DirectDependents() | String | Terms using this term in a formula |
| NumDirectDependents | Integer | Number of direct dependents |
| RefersTo | Variant | Entire row in spreadsheet (an Excel range object) |
| NumSecondaryRefs | Integer | Number of times this term has been cloned |
| SecondaryReferenceOf | Range | Term this is a clone of |
| UserDefinedRow | Boolean | Entire row is set by user (ignored by financial statement editor) |
| PriorYrHistory | String | Value = X for term having X_Prior in its formulas |

A finRow object for an input statement includes all of the above properties, along with the following additional properties.

| Additional Input finRow Properties | Value | Description |
|---|---|---|
| InputforStmts() | Integer | finStatement numbers for which this row is an input |
| NumInputStmts | Integer | Number of statements for which this row is an input |

-continued

| Additional Input finRow Properties | Value | Description |
|---|---|---|
| ExclusivelyOneFstmt | Boolean | Row is only an input for the statement being processed |

A finColumn object has the following properties.

| finColumn Properties | Type | Description |
|---|---|---|
| Name | String | Defined name of the column |
| Time | Date | Actual date corresponding to label in spreadsheet |
| Parent | String | finStatement name |
| ColumnNumber | Integer | Number of column in spreadsheet |
| LabelCell | Range | Cell corresponding to the time label |
| PeriodKind | String | Period of Time (e.g., year, month) |
| Refers to | Variant | Entire column in spreadsheet |

A finTime_Styles object has the following properties.

| finTime_Styles Property | Type | Description |
|---|---|---|
| Name | String | Name user has defined for this view |
| BaseDate | Date | Date to use for "this period" (generally last year) |
| BeginDate | Date | Beginning date of period (may be historical) |
| EndDate | Date | Ending date of period |
| Periodunit | String | Duration of one period (e.g., year) |
| numPeriods | Integer | Number of period labels in the range |

Financial Statement Editing Tools

Figure 6:
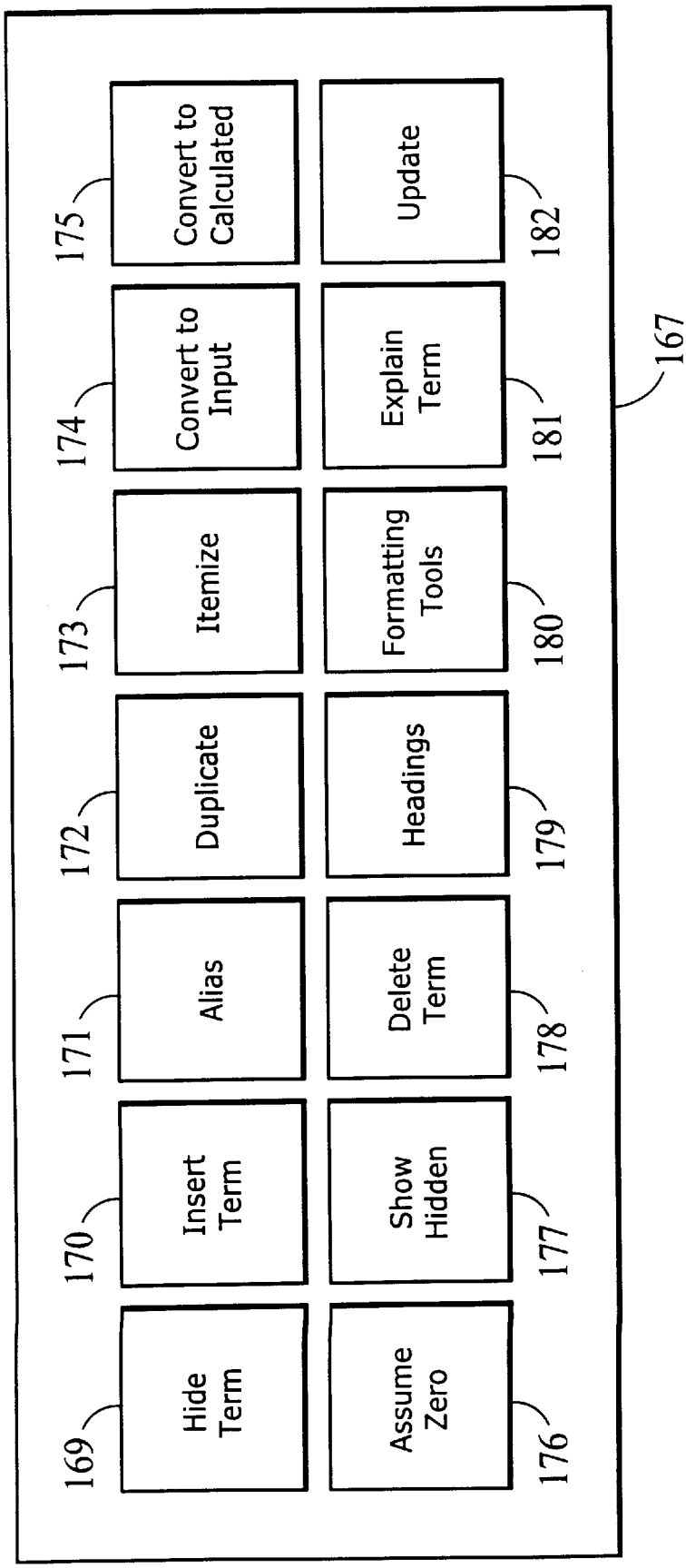
FIG. 6 is a diagrammatic view of a menu of financial statement editing tools.

Referring to FIG. 6, system 22 includes a menu 167 of financial statement editing tools which allow the user to edit a mockup financial statement. A user can insert a term from statement editor 24 into the financial statement by selecting an INSERT TERM editing tool 170. A user can create an alias for a term by selecting an ALIAS editing tool 171 to change the displayed name of a term. System 22 maintains the integrity of the financial statement by preserving the original meaning of the term as specified in financial statement editor 24.

A user can duplicate a term by selecting a DUPLICATE editing tool 172. This breaks up a single input term into two separate input terms. System 22 maintains the integrity of the financial statement by replacing each instance of the original input term in a spreadsheet formula with the sum of the two new input terms.

A user can itemize a term by selecting an ITEMIZE editing tool 173. This breaks up a term into one or more subitems. System 22 inserts into the financial statement a new total term whose value is the sum of the subitems.

A user can convert a calculated term into an input term by selecting a CONVERT TO INPUT editing tool 174, which obtains the term's value from financial database 30 or directly from the user. A user can also can re-convert a converted input term back to a calculated term by selecting a CONVERT TO CALCULATED editing tool 175. A user can direct system 22 to convert a calculated term to an input term and set the term's value to zero when populating the mockup financial statement with values by selecting an ASSUME ZERO editing tool 176.

A user can hide a term by selecting a HIDE TERM editing tool 169. A user can direct system 22 to show hidden terms (e.g., hidden predecessors of a calculated term that are automatically added to the mockup financial statement by system 22) by selecting a SHOW HIDDEN editing tool 177. A user can delete a term by selecting a DELETE TERM editing tool 178.

A user can toggle headings so that the user can see the grids and conventional alphanumeric headers for the matrix of rows and columns by selecting a HEADINGS editing tool 179. A user can change the format of the mockup financial statement, for example, by changing the appearance (style) of a row or by moving a row to a different location by selecting one or more FORMATTING TOOLS 180.

A user can also direct system 22 to report the properties of a term by selecting an EXPLAIN TERM tool 181.

Once a mockup financial statement has been created, a user can direct system 22 to create (or update) an input statement and populate the mockup financial statement with data and spreadsheet equations by selecting an UPDATE editing tool 182.

INSERT TERM

System 22 allows a user to insert a financial term (which may be an entire financial section) into the mockup financial statement. System 22 maintains the integrity of the financial statement by automatically inserting calculated terms that are predecessors of the inserted term; the automatically inserted terms, however, are hidden in the mockup financial statement.

Figure 7:
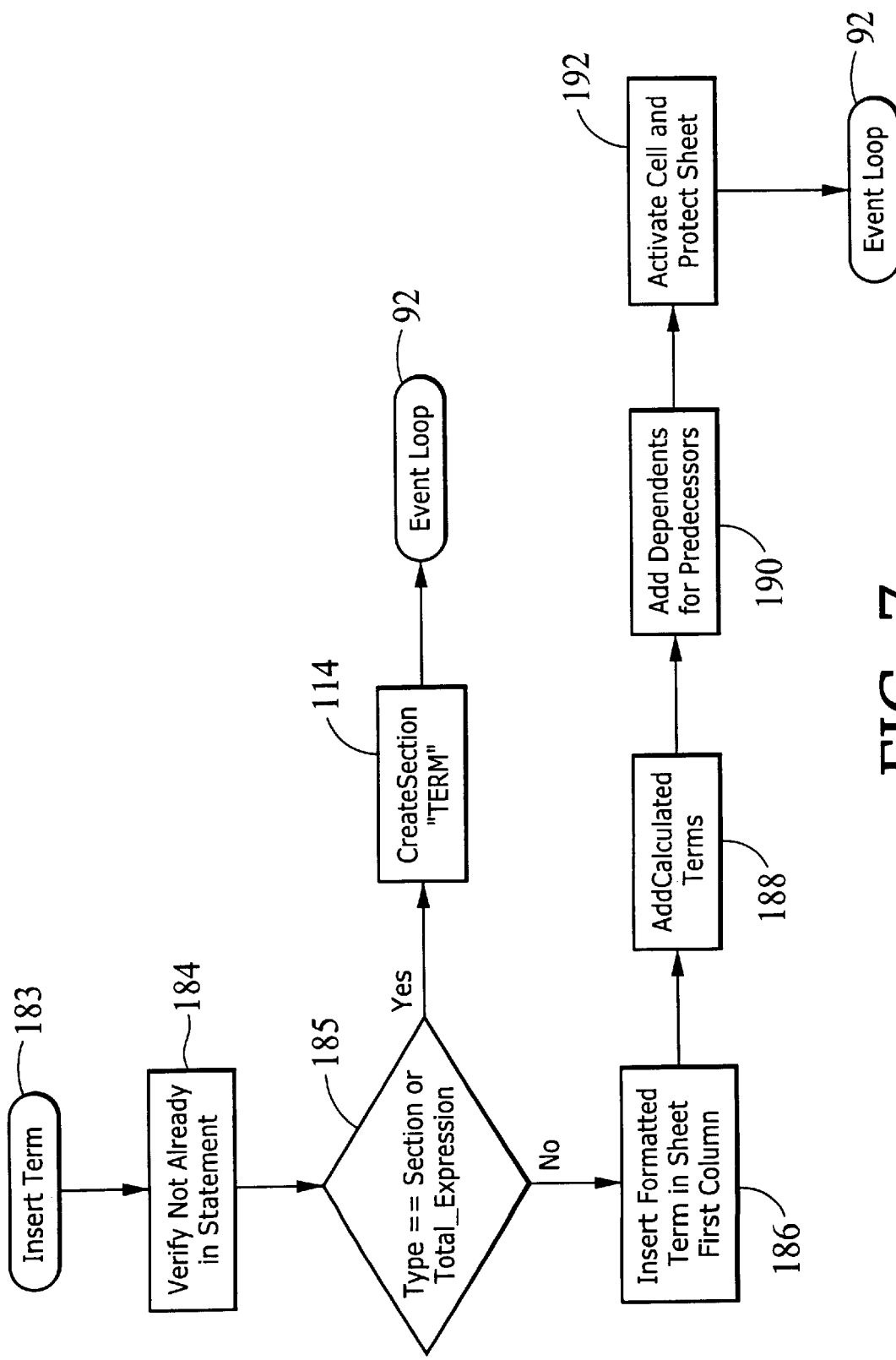
FIG. 7 is a flow diagram of a method of inserting a term into a financial statement.

Referring to FIG. 7, a financial term may be inserted into a mockup financial statement as follows (step 183). A user positions the cursor in an open cell of terms column 38 and activates INSERT TERM editing tool 170 from the financial statement editing tools menu. System 22 displays three-pane browser 111 (FIG. 3C) and the user uses it to select the term to be added (e.g., gross profit). System 22 verifies that the term is not already in the mockup statement (step 184). If the selected term is a section (e.g., costs) or a total expression as determined from the ISA relation for the term (step 185), system 22 creates a section for the term in accordance with the definition contained in financial knowledge base 23 (step 114; FIG. 5); otherwise, system 22 inserts the term (e.g., gross profit) in terms section 38 (step 186). System 22 automatically inserts into terms section 38 each of the calculated predecessor terms (e.g., net sales and cost of sales) that appears in the spreadsheet formula associated with the added term, if any (step 188). After the calculated terms are added, system 22 hides them so that they are not displayed on the mockup financial statement. System 22 also sets the DependentTo property of the predecessor terms (step 190). System 22 activates the cell containing the added term and protects the mockup financial statement (step 192). System 22 then returns control to the event loop and responds to subsequent user actions (step 92).

ALIAS

System 22 allows the user to change the name of a financial term appearing in the mockup financial statement, while maintaining the original meaning of the term as specified in financial statement editor 24.

Figure 8:
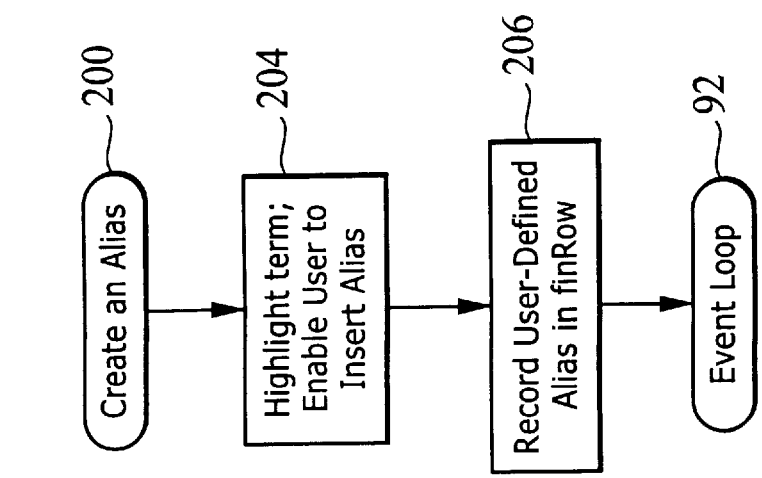
FIG. 8 is a flow diagram of a method of creating an alias for a term appearing in a financial statement.

Referring to FIG. 8, an alias for a term may be created as follows (step 200). A user positions a cursor in the cell of the term to receive the alias and selects ALIAS editing tool 171 from the editing tools menu. System 22 highlights the term name and allows the user to replace the term name with an alias (step 204). The user may alternatively type over the displayed name. System 22 records the alias in the alias property section of the associated finRow object (step 206). When the user updates the mockup financial statement, system 22 displays the user-defined alias wherever the original term appears in the mockup financial statement, including the input spreadsheet and the formulas in which the term is a direct predecessor, but not in financial knowledge base 23 in three-pane browser 111 (FIG. 3C). System 22 then returns control to the event loop and responds to subsequent user actions (step 92).

DUPLICATE

System 22 allows the user to create and rename multiple copies of an input term so that multiple inputs that should be summed together in one or more spreadsheet formulas can be separately displayed in the mockup financial statement. System 22 maintains the integrity of the financial statement by summing the copied terms in the spreadsheet formulas that are dependents of the term that was originally duplicated.

Figure 9:
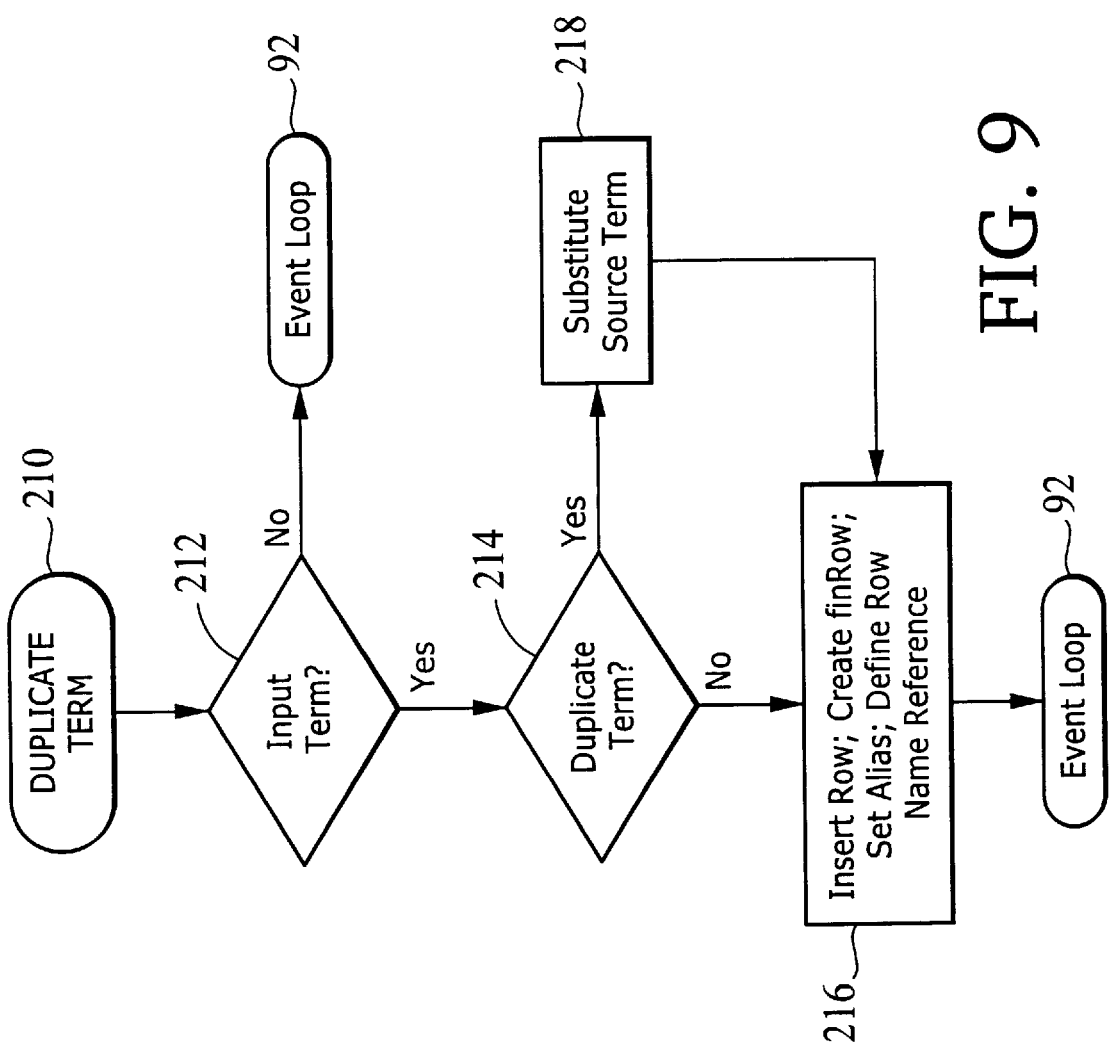
FIG. 9 is a flow diagram of a method of duplicating a row in a financial statement.

Referring to FIG. 9, a user can break up an input term into two separate input terms by duplicating the row containing the term. For example, a user can break up Returns term 132 into "European Returns" and "U.S. Returns" by positioning the cursor in a cell containing the Returns term and selecting DUPLICATE editing tool 172 (step 210). If the term to be duplicated is not an input term (default input or user-defined input) (step 212), system 22 returns control to the event loop and responds to subsequent user actions (step 92)—i.e., system 22 does not allow a user to duplicate a calculated term, an itemized term or an itemization. If the term is an input term and the term is not a duplicate of a another term (step 214), system 22 inserts into the mockup financial statement a row with a label built from the duplicated term and a unique identifier suffix (e.g., "Returns1") and creates a corresponding finRow object pointing back to the original source term (e.g., the DuplicateOf property is set to Returns) (step 216). System 22 also allows the user to set an alias for the inserted term (e.g., to change "Returns1" to "European Returns") (step 216). If the user selects for duplication an already duplicated term (e.g., Returns1), system 22 looks up the source term (e.g., Returns) (step 218) and duplicates the source term (step 216). After a duplicate term has been created, system 22 returns control to the event loop and responds to subsequent user actions (step 92).

If an input term is duplicated on one statement, wherever that term is referenced in formulas on other statements, the sum of the duplicates (e.g., Returns+Returns1) is used. The references in the other statements become secondary references by virtue of the duplication in the one statement. Thus, a duplicated input term is treated on other statements exactly as it is treated on the statement in which it is duplicated. System 22 does not allow a user to duplicate a secondary reference.

ITEMIZE

System 22 allows the user to define a term as a sum of one or more user-defined inputs by itemizing the term. A term that is itemized will be referred to as an "itemized term" and the one or more user-defined inputs that are summed to obtain the value of the itemized term will be referred to as "itemizations."

Figure 10:
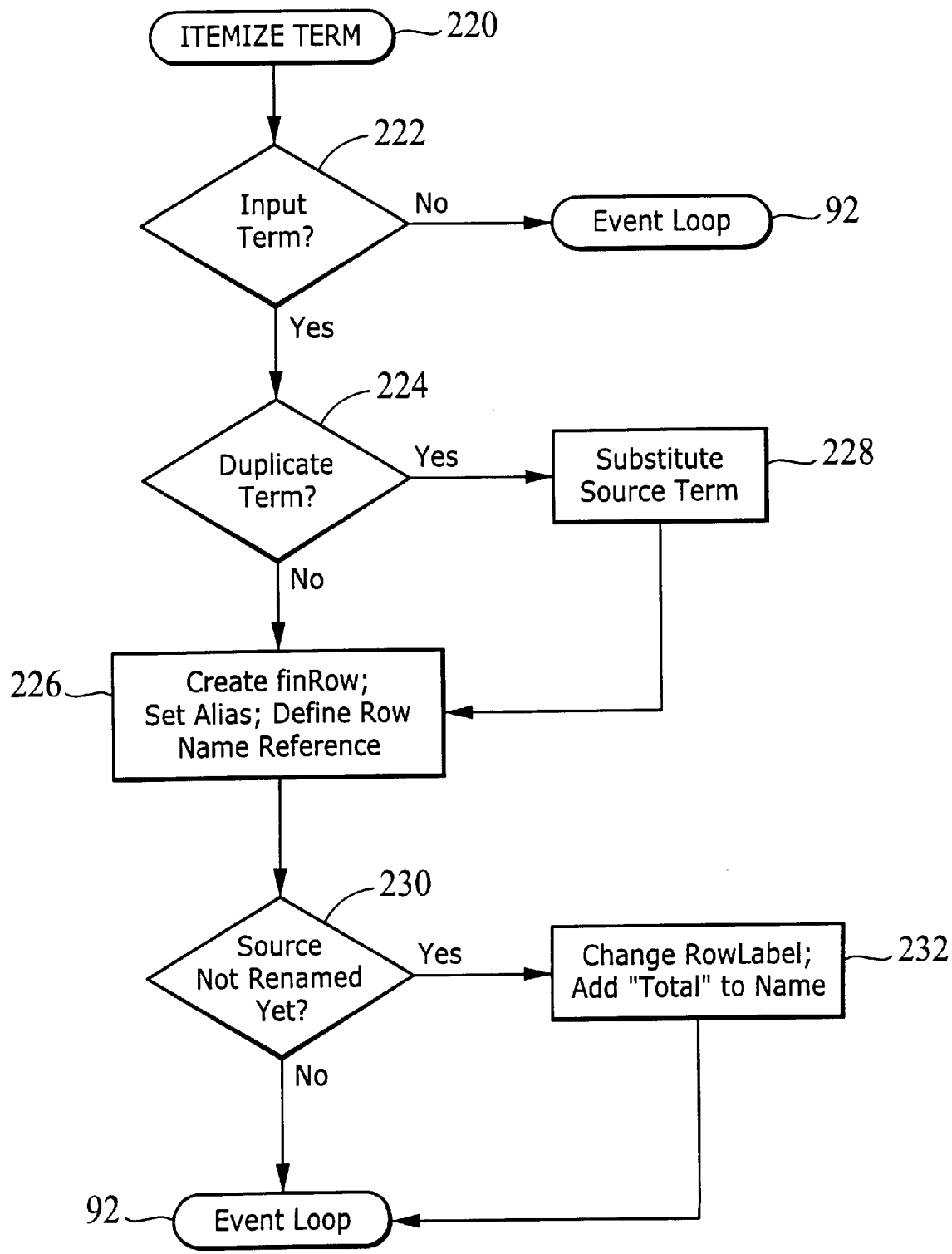
FIG. 10 is a flow diagram of a method of itemizing a row in a financial statement.

Referring to FIG. 10, a user can itemize an input term to create a total term (e.g., TotalReturns) which represents the sum of two or more user-defined input terms (e.g., European Returns+U.S. Returns) by selecting ITEMIZE editing tool 173 from the financial statement editing tools menu when the cursor is positioned on the term to be itemized (e.g., Returns) (step 220). If the term to be itemized is not an input term (default input or user-defined input) (step 222), system 22 returns control to the event loop and responds to subsequent user actions (step 92)—i.e., system 22 does not allow a user to itemize a calculated term or a duplicated term. If the term is an input and the term is not an itemization of another term (step 224), system 22 inserts into the mockup financial statement a row with the same label as the itemized term with a unique identifier attached (e.g., "Returns1") and creates a corresponding finRow object pointing back to the original source term (i.e., the ItemizationOf property is set to "Returns") (step 226). System 22 also allows the user to set an alias of the itemized term (e.g., to change "Returns1" to "European Returns") (step 226). If the user itemizes an itemized term (e.g., Returns1), system 22 looks up the source term (step 228) and itemizes the source term (step 226). If the source term (e.g., Returns) has not been renamed (step 230), system 22 changes the term's label by prepending the word "Total" to the original label (e.g., to yield "TotalReturns") (step 232). System 22 then returns control to the event loop and responds to subsequent user actions (step 92).

If an input term (e.g., Returns) is itemized on one financial statement in a project workbook, the total term (e.g., TotalReturns) is referenced wherever the original term (e.g., Returns) is referenced on other financial statements (either as an inserted term or in a formula) in the workbook. Thus, an itemized term is treated on other financial statements exactly as it is treated on the statement in which it is itemized. System 22 does not allow the user to itemize a secondary reference. If an input term that is already duplicated or itemized on one financial statement is inserted into another financial statement, the new insertion is defined as a secondary reference in the associated finRow object and cannot itself be itemized. The original itemization on the one financial statement is defined as a primary reference and its clones on the other financial statements are secondary references to the itemization. If a calculated term on one financial statement is required by a formula on another financial statement, then a reference is made from the second financial statement to the first financial statement (i.e., the original term does not have to be copied into the second financial statement).

DELETE TERM

Figure 11:
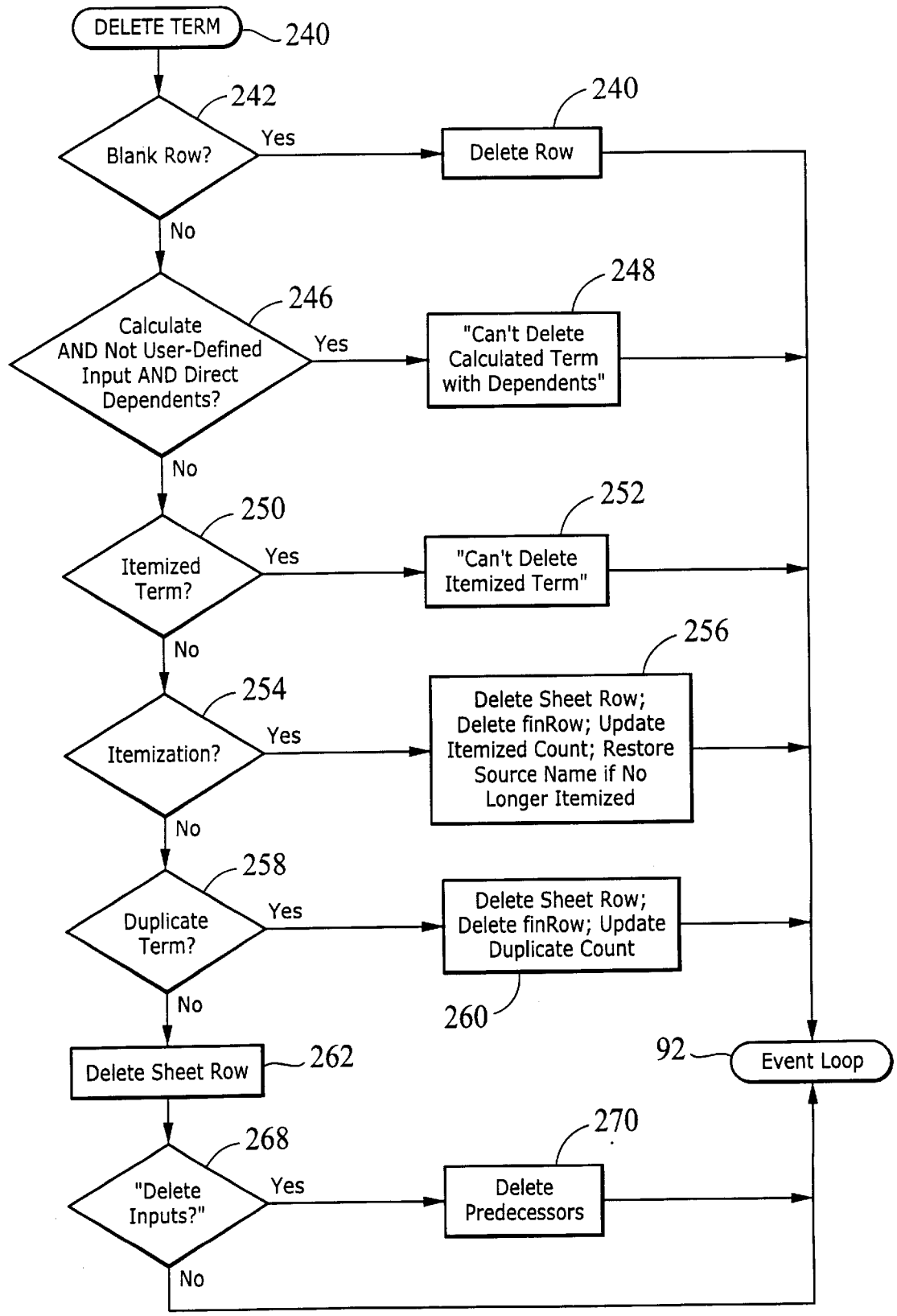
FIG. 11 is a flow diagram of a method of deleting a row in a financial statement.

Referring to FIG. 11, a user can delete a row so that a term does not appear in the mockup financial statement by selecting DELETE TERM editing tool 178 from the financial statement editing tools menu when the cursor is positioned on the row to be deleted (step 240). If the row is a blank row (step 242), system 22 simply deletes the row (step 244) and returns control to the event loop and responds to subsequent user actions (step 92). If the row contains a calculated term (e.g., gross profit term 136; FIG. 4) that is not defined to be an input term (i.e., the user did not convert a previously calculated term into an input term using CONVERT TO INPUT editing tool 174) and that has direct dependents (e.g., gross profit term 136; FIG. 4) (step 246), system 22 notifies the user that calculated terms with dependents cannot be deleted (step 248) and returns control to the event loop (step 92). If the row contains an itemized term (step 250), system 22 notifies the user that itemized terms cannot be deleted (step 252) and returns control to the event loop (step 92). If the row contains an itemization (step 254), system 22 deletes the row from the mockup financial statement, deletes the corresponding finRow from the finStatement object for the mockup financial statement, reduces by one the NumItemizations property of the source term, and restores the original source name if there are no itemizations for the term (e.g., changes "TotalReturns" to "Returns") (step 256). System 22 then returns control to the event loop and responds to subsequent user actions (step 92).

If the row to be deleted contains a duplicate term (step 258), system 22 deletes the row from the mockup financial statement, deletes the corresponding finRow from the finStatement object for the mockup financial statement, and reduces by one the NumDuplicates property of the source term (step 260). System 22 then returns control to the event loop and responds to subsequent user actions (step 92). If the row to be deleted contains an input term (default input or user-defined input) or a calculated term with no direct dependents (i.e., there is no other term in the mockup financial statement that depends on the term), system 22 deletes the row from the mockup financial statement (step 262). If the term is calculated from input terms, system 22 asks the user whether the input terms should also be deleted (step 268). If the user indicates that the input terms should be deleted, system 22 deletes each of the direct predecessors of the deleted calculated term (step 270). System 22 then returns control to the event loop and responds to subsequent user actions (step 92).

The deletion of an input term from one financial statement has no effect on the appearance of that term on other financial statements because deletion of a term from one statement indicates only that the term should not appear on that statement, not that the term is to be ignored in calculations. If the term to be deleted is a primary calculated term, system 22 converts one of the secondary references to be the primary term and all of the other references are modified to point to the converted term. Converting a calculated term to an input term and re-converting an input term back to a calculated does not affect references to the term on other financial statements because all references will still refer to the converted term and use its value. A term that is converted to input can only be hidden, not deleted.

HIDE TERMS

A user can hide a term appearing in the mockup financial statement by selecting HIDE TERM editing tool 169 when the cursor is positioned in the cell of the term to be hidden. If the cell does not contain a term, system 22 deletes the row containing the cell; otherwise, system 22 sets the Hidden property of the finRow object for the term to True. The row corresponding to this term is then not displayed on the mockup financial statement (or, later, on the completed financial statement report) because spreadsheet program 26 is configured to display only terms with Hidden property values set to False. Hidden terms cannot be duplicates or itemizations. The user may reveal a term by selecting an UNHIDE TERM editing tool, which directs system 22 to set the Hidden property of the finRow object to False.

A user can obtain a list of terms that are hidden in the mockup financial statement by selecting SHOW HIDDEN editing tool 177. System 22 responds by displaying a list of the names (aliases, if previously set) of the terms with Hidden properties set to True. If there are no hidden terms in the statement, system 22 displays the message, "There are no hidden items in this statement."

CONVERT TO INPUT ASSUME ZERO, CONVERT TO CALCULATED

A user can convert a calculated term into an input term by selecting CONVERT TO INPUT editing tool 174. A user may also convert a calculated term into an input term and have the term's value set to zero when the financial statement is populated with values by selecting ASSUME ZERO editing tool 176. System 22 responds in either case by setting the UserDefinedInput finRow property for the term to True. A section header cannot be converted to an input. A Total term cannot be assumed to have a value of zero; the user must delete itemizations before the term can be assumed to be zero. A user can change a term from an assumed zero term to a regular input term by selecting CONVERT TO INPUT editing tool 174.

The user is given the option of recursively hiding the predecessors (former inputs) of a calculated term that is converted to input or assumed to be zero. If the term converted to input or assumed zero is the only dependent of a predecessor to be hidden, system 22 hides the predecessor and marks the DependentMadeInput and DependentMadeZero properties of the predecessor so that it does not appear in the input statement.

A user can reconvert a term converted to input or assumed to be zero back into a calculated term by selecting CONVERT TO CALCULATED editing tool 175. System 22 responds by setting the UserDefinedInput and AssumeZero finRow properties for the term to False. The user is given the option of displaying any hidden predecessors for the term converted back to calculated. In the case of an itemization, system 22 displays each of the itemizations and hides the Total term. In the case of an arbitrary dependent, system 22 recursively displays each of the predecessors and sets the DependentMadeInput and DependentAssumeZero finRow properties of the predecessors to False so that the input statement will contain the proper terms when updated. An itemization and a section header cannot be converted to be calculated terms.

EXPLAIN TERM, HEADINGS FORMATTING TOOLS

A user can view the properties of a term by selecting the EXPLAIN TERM editing tool 181. System 22 responds by displaying the stored values for each of the finRow properties for the specified term, including the definition of the term contained in financial knowledge base 23 and any user-defined properties.

As mentioned above, by selecting HEADINGS editing tool 179, a user can toggle the display of the mockup financial statement formatted as specified in statement editor 24 or formatted with Excel grids and conventional alphanumeric headings for the matrix of rows and columns corresponding to the financial statement.

By selecting one or more FORMATTING TOOLS 180, a user may, for example, move a row up, move a row down, and change the appearance of text in the financial statement (e.g., bold, italic, underline, double underline, indent, shading such as gray shading or green shading). The following table summarizes some of the editing options available to a user.

Editing Options

| User Action | System Response |
| --- | --- |
| Press Enter (or Return) key when cursor positioned on a blank row | Insert a new term |
| Type over term name | Create an alias |
| Press backspace key followed by Enter (or Return) key | Delete a term |
| Select search tool in financial knowledge base dialogue | Display an alphabetical list of all terms in the financial knowledge base |
| Select statement name then pull down menu INSERT/Rows | Add a blank row above the first term |
| Type over statement name (automatically changes statement tab) | Replace statement name |
| Use Excel's formatting tool bar (automatically displayed when a cell is selected in formattable areas) | Reformat statement name, period labels, data, and borders |
| Create a blank row before and after terms to be grouped, then type a section header name in the first blank row | Create a new section |
| Select the header for a section, then apply the Move Up or Move Down editing tool | Move an entire section |
| Select either an Itemization TOTAL or an existing item, then apply the Itemization editing tool | Create a new subitem |
| Apply the Show Hidden editing tool | Reveal hidden terms created when formulas are generated |
| Type a new number over a calculated value | Temporarily reveal the effect of changing a calculated value; the number will revert to its calculated value when user selects another cell |
| Enter values in the input spreadsheet (user-defined values appear in magenta there and in the mockup statement if they overwrite database values, in green if user supplies initial values, and in blue if values correspond to database values) | Enter or modify input values, propagate through formulas |
| Create a new statement or revise an existing full statement, then save the project | Create a statement template |
| Save a project before closing, then open the saved project | Re-edit a project during a later Excel session |
| To clone a term, insert term again on any spreadsheet | Create a secondary reference |

Updating the Input Statement/Populating the Mockup Statement

Figure 12:
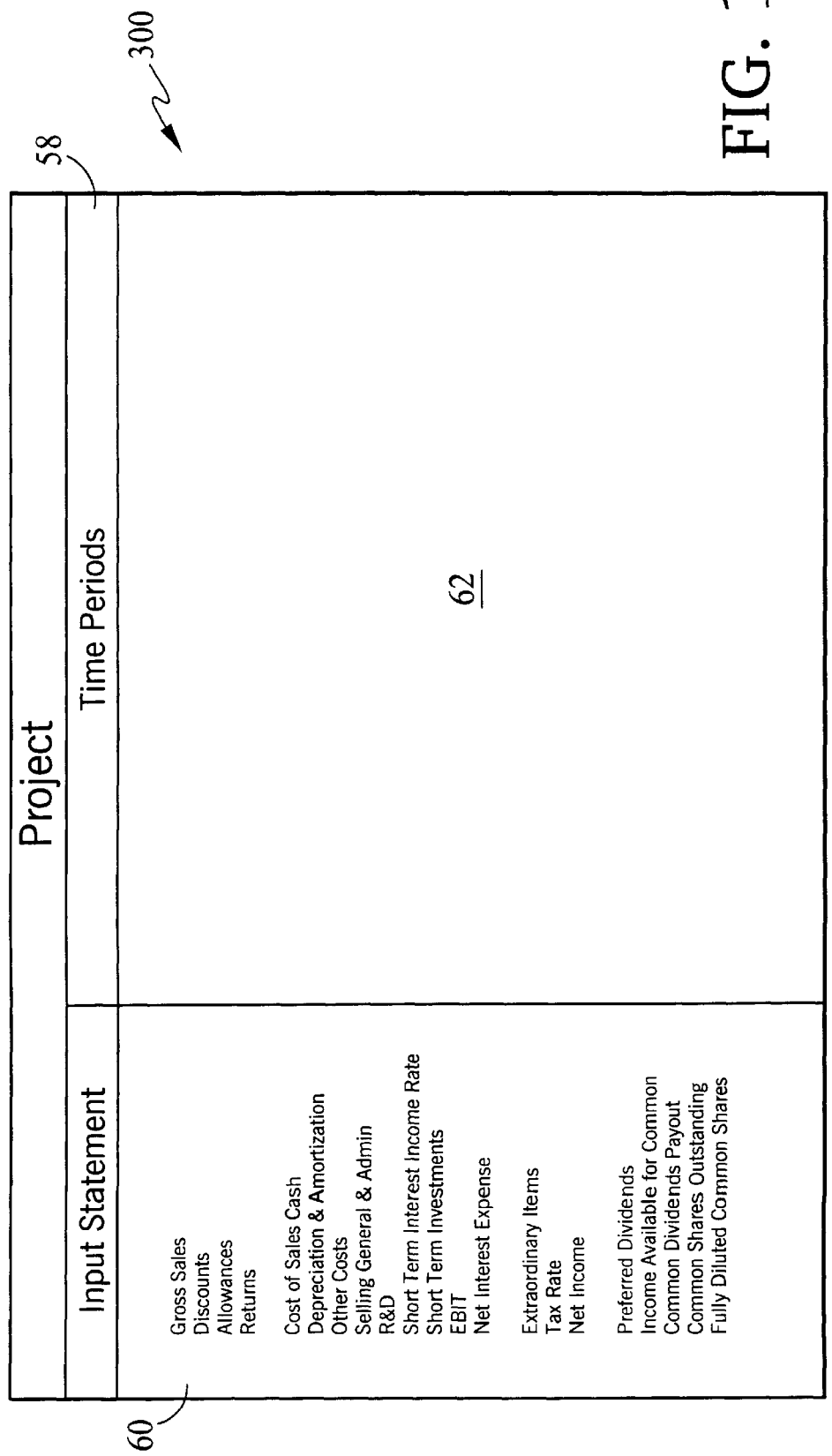
FIG. 12 is a diagrammatic view of an input sheet for the income statement of FIG. 4.

System 22 automatically creates (or updates) the input statement when the user selects UPDATE editing tool 182 from the financial statement editing tools (FIG. 6), or selects the input statement tab located at the bottom of the project workbook window displayed on user interface 28. System 22 creates input statement 52 by collecting all of the inputs needed to populate the mockup financial statement with values. For example, as shown in FIG. 12, an input statement 300 created for income statement 44 (FIG. 4) contains all of the inputs needed to populate income statement 44 with values. The input terms are inserted into terms area 60 and the associated values (obtained from another spreadsheet, an external database, or direct user input) are located in inputs area 62 under time periods area 58.

System 22 first establishes a new project spreadsheet labeled "INPUT", to which financial terms and values will be written. When the input spreadsheet is first created, the time range is displayed based upon the time style defined in the referenced financial statement. System 22 defines a parallel finStatement which contains pointers back to the INPUT spreadsheet and contains all of the information about these rows and columns of the INPUT spreadsheet. The INPUT spreadsheet is fully described by internal objects corresponding to the type data structure of a finStatement with its finRows, finColumns, and finCells. As explained below, once all of the inputs have been added to the INPUT spreadsheet, system 22 sets pointers from the mockup financial statement to the INPUT spreadsheet and sets the formulas for calculated terms.

Figure 13:
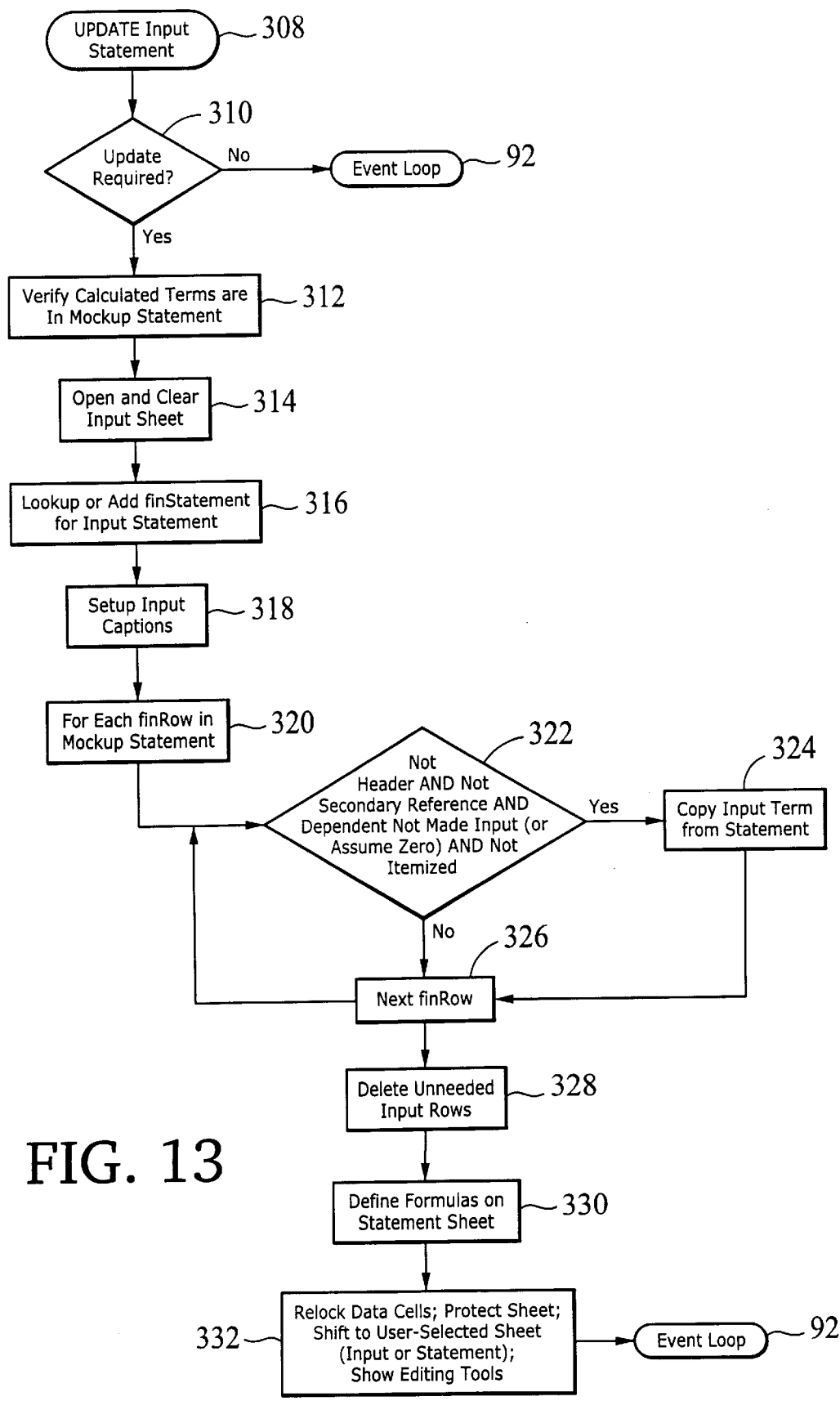
FIG. 13 is a flow diagram of a method of updating an input statement.
Figure 13A:
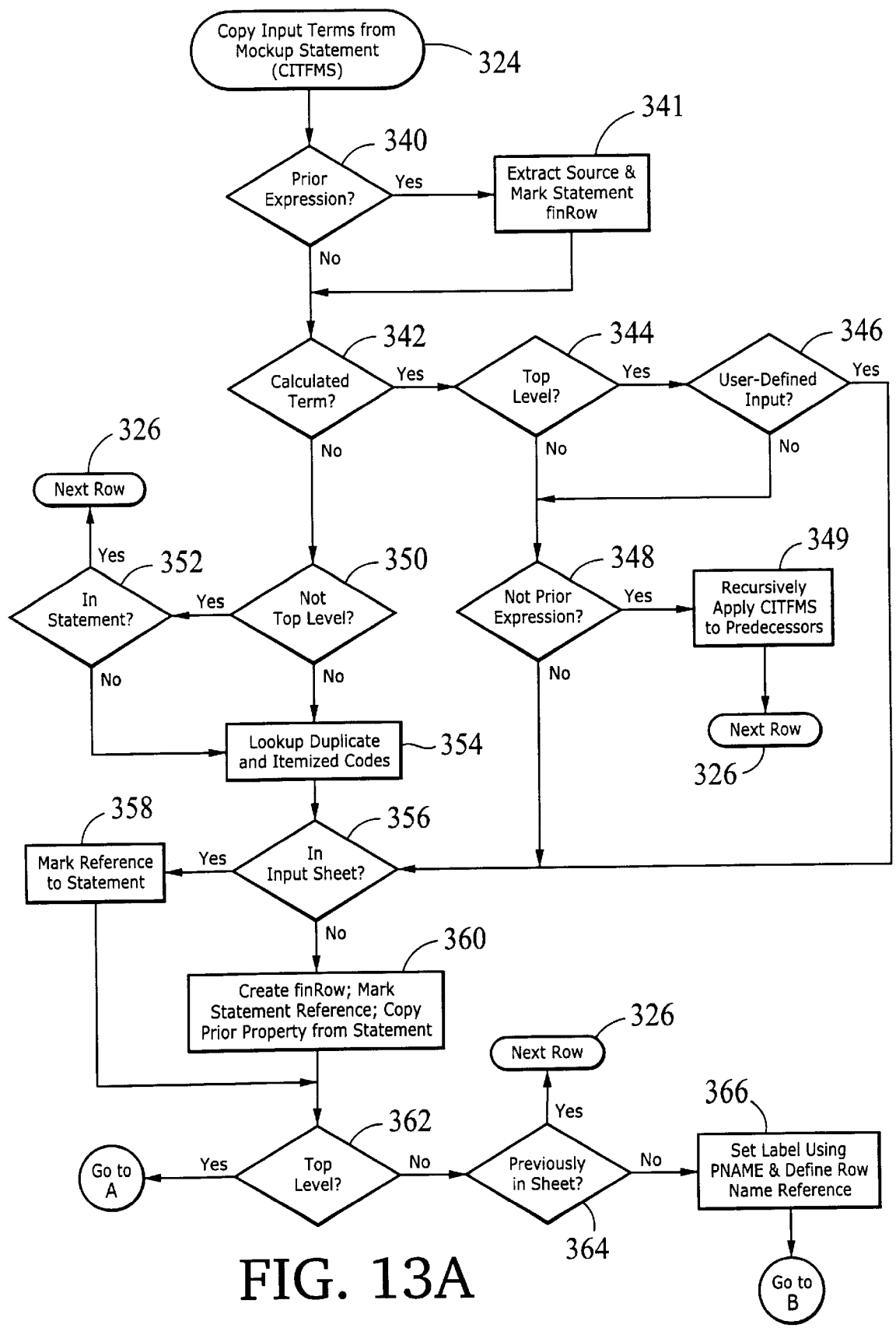
FIGS. 13A and 13B are flow diagrams of a method of copying input terms from a financial statement into an input statement.
Figure 13B:
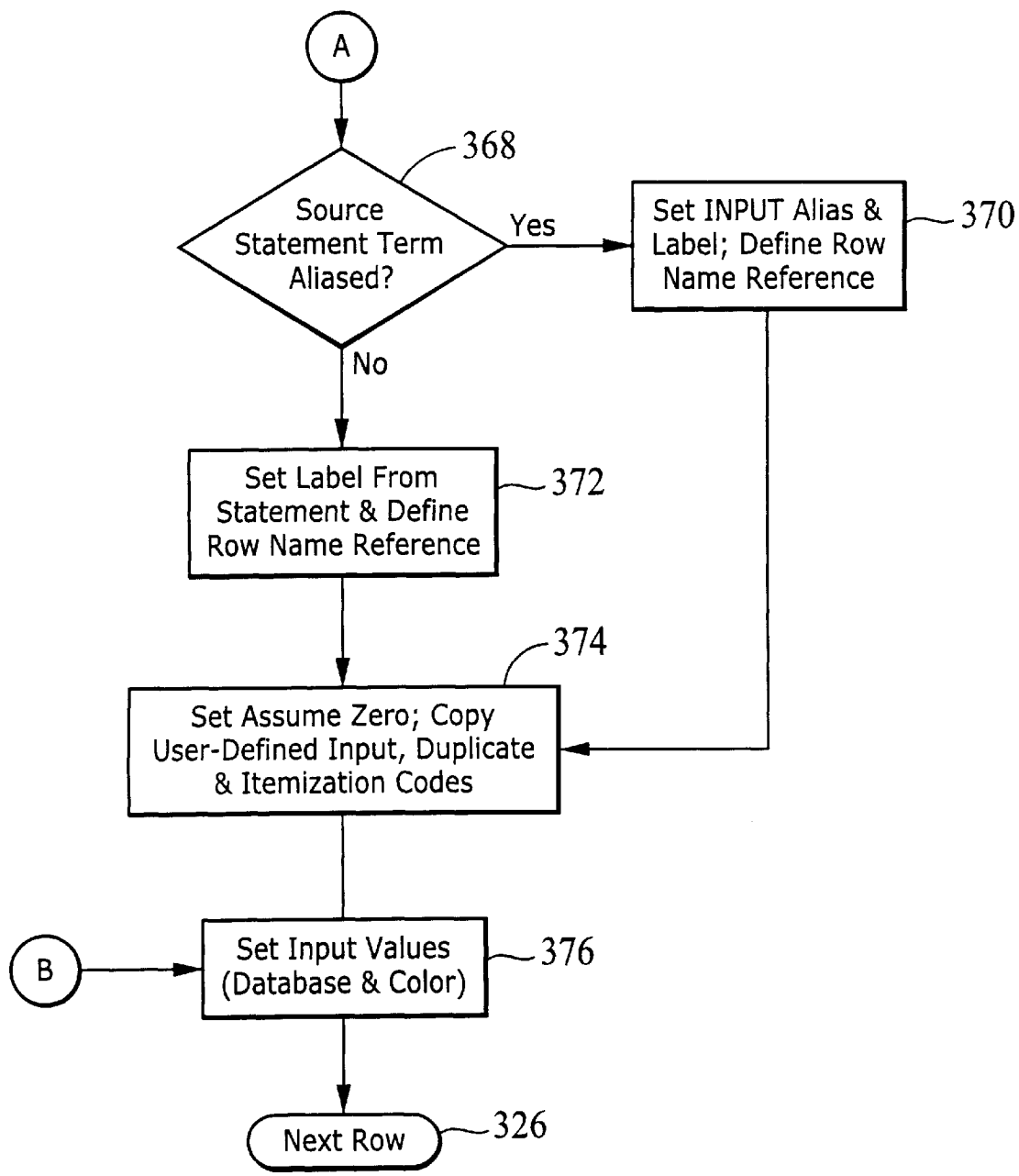

Referring to FIG. 13, a user may update the input statement by selecting UPDATE editing tool 182 (step 308). If there have not been any changes to the mockup financial statement that affect the input statement (step 310), system 22 returns control to the event loop and responds to subsequent user actions (step 92). System 22 verifies that there are calculated terms in the mockup financial statement (step 312). System 22 opens and clears the input statement (step 314). System 22 looks up or adds a finStatement object for the input statement (step 316). System 22 automatically inserts project name 54, input statement identifier 56, and time periods captions 58 into the input statement (step 318). For each finRow associated with the mockup financial statement, system 22 performs the following steps (step 320). If the term is not a header, not a secondary reference, not a term whose dependent was converted to an input or assumed to be zero, and not itemized (step 322), system 22 copies the input term from the mockup financial statement into the input statement (step 324; FIG. 13A). In effect, step 322 screens out headers and calculated terms that are not needed in the input statement. System 22 then repeats step 322 for the next finRow associated with the mockup financial statement (step 326). System 22 deletes terms that are not needed from the input statement (step 328). System 22 inserts formulas on the mockup financial statement (step 330; FIG. 13B). System 22 then relocks the data cells, protects the sheets, displays the statement selected by the user (input statement or mockup financial statement), and displays the financial statement editing tools menu (step 332). System 22 returns control to the event loop and responds to subsequent user actions (step 92).

Referring to FIG. 13A, in order to copy the required input terms from the mockup financial statement to the input statement, each finRow of the mockup financial statement is processed as follows (step 324). If the term depends upon a term from a different time period (a "prior expression") (step 340), system 22 extracts the source term and marks the PriorYrHistory property of the finRow object for the term (step 341). For example, the term change_in_deferred_taxes, which is part of cash flow statement 48 (FIG. 2A), is defined as deferred_taxes minus deferred_taxes_prior; the source term is deferred_taxes. If the term is a calculated term (step 342), and the term is not a top level term (i.e., the term appears in a spreadsheet formula) (step 344) or a user-defined input term (step 346) and the term is not a prior expression (step 348), system 22 parses the spreadsheet formula for the term and recursively returns to step 324 for each term in the spreadsheet formula (step 349). After each of the term's inputs has been copied into the input statement, the next finRow object is processed (step 326). If the term is not calculated (step 342) and is not a top level term (step 350), system 22 determines whether the term appears in the mockup financial statement (step 352). If the term appears in the mockup financial statement, system 22 processes the next finRow object (step 326). If the term does not appear in the mockup financial statement (step 352), or if the term is a top level term (i.e, a spreadsheet formula is not currently being analyzed) (step 350), system 22 determines the DuplicateCode and the ItemizationCode properties of the finRow object for the term (step 354); these properties are used for looking up the term in the input statement. If the term is in the input statement (step 356), system 22 marks a reference to the mockup financial statement and sets a "previously in sheet" property for the term (step 358). If the term is not in the input statement (step 356), system 22 creates a finRow object, marks a reference to the mockup financial statement, and copies the PriorHistory property of the term (step 360). If the term is not a top level term (step 362) and is a term that was just added to the input statement in step 360 (step 364), system 22 processes the next finRow object for the mockup financial statement (step 326); if the term was not just added to the input statement in step 360 (step 364), system 22 sets the label using the PNAME relation of the term and defines the row name reference for the term (step 366).

Referring to FIG. 13B, if the term is a top level term (step 362, FIG. 13A) and the source term appearing in the mockup financial statement is aliased (step 368), system 22 sets the alias property and label property in the finRow object for the term and defines the row name reference (step 370). If the term appearing in the mockup financial statement is not aliased (step 368), system 22 sets the label property in the finRow object for the term and defines the row name reference (step 372). System 22 sets the AssumeZero and UserDefinedInput properties and copies the UserDefinedInput, DuplicateCode, and ItemizationCode values in the finRow object for the term (step 374). System 22 sets the input values, including the values obtained from financial database 30 (FIG. 1) and the font color values described above (step 376). System 22 then processes the next finRow object for the mockup financial statement (step 326).

Figure 13C:
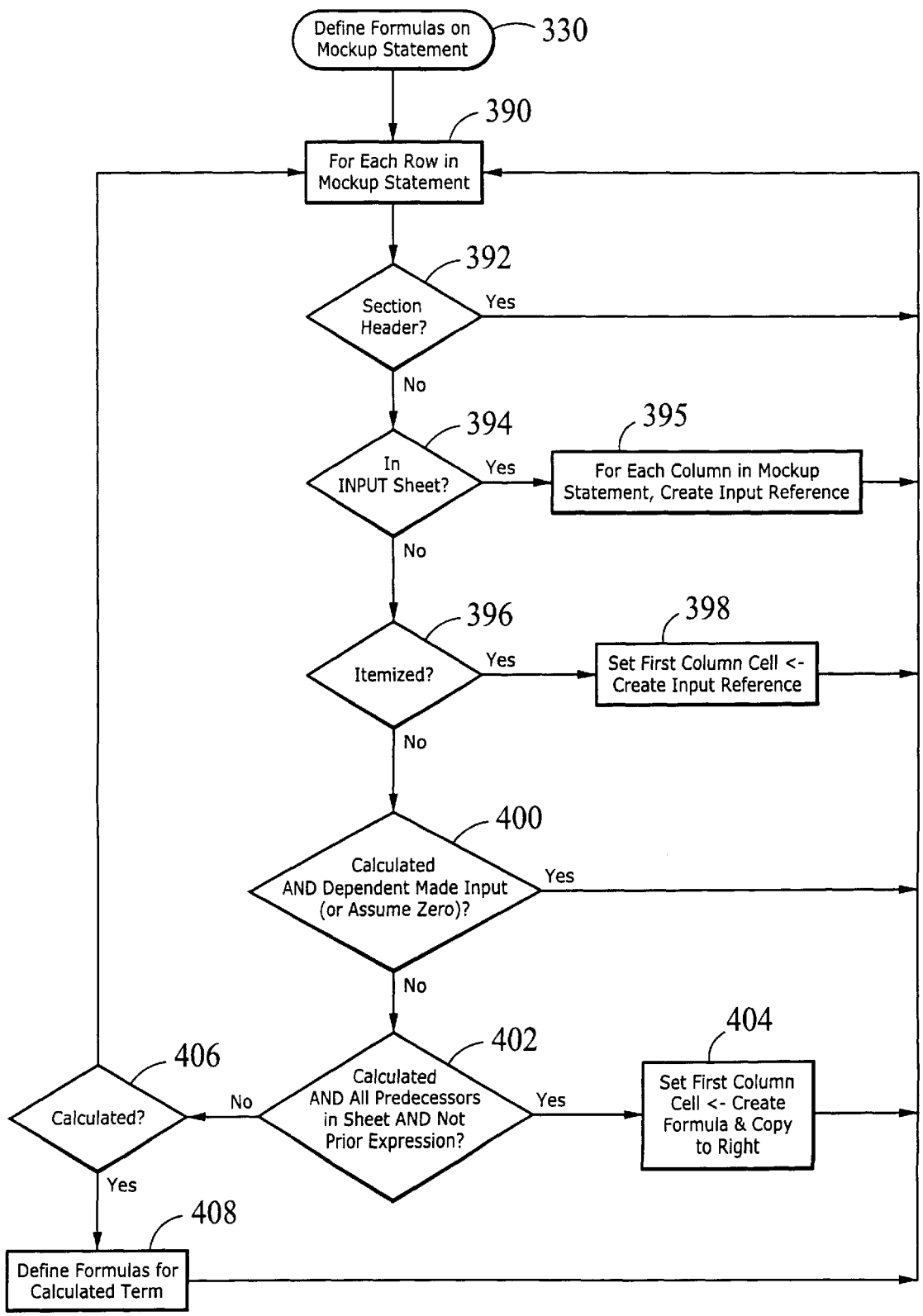
FIGS. 13C and 13D are flow diagrams of a method of defining formulas on a financial statement.

Referring to FIG. 13C, system 22 inserts formulas into the mockup financial statement as follows (step 330; FIG. 13). For each row in the mockup financial statement, system 22 performs the following steps (step 390). If the row contains a section header term (step 392), system 22 proceeds to the next row (step 390). If the row contains a term that is in the input spreadsheet (step 394), system 22 creates a reference from each column in the mockup financial statement to the corresponding column in the input statement (step 395); system 22 then proceeds to the next row (step 390). If the row contains an itemized term (step 396), system 22 creates an item total spreadsheet formula, copies it into the first column cell of the row, and uses Excel to copy the appropriate formulas into the remaining columns of the mockup financial statement (step 398). If the row contains a calculated term and its dependents are assumed to be zero or its dependents have been converted to inputs (step 400), system 22 proceeds to the next row (step 390). If the row contains a calculated term and all of its predecessors appear in the mockup financial statement and none of the predecessors are prior expressions (step 402), system 22 creates the formula, copies it in the first column cell of the row, and uses Excel to copy the appropriate formulas into the remaining columns of the mockup financial statement (step 404). If the row does not contain a calculated term (step 406), system 22 proceeds to the next row in the mockup financial statement (step 390). If the row contains a calculated term (step 406), system 22 inserts formulas for the calculated term into each column of the mockup financial statement (step 408), then proceeds to the next row in the mockup financial statement (step 390).

Figure 13D:
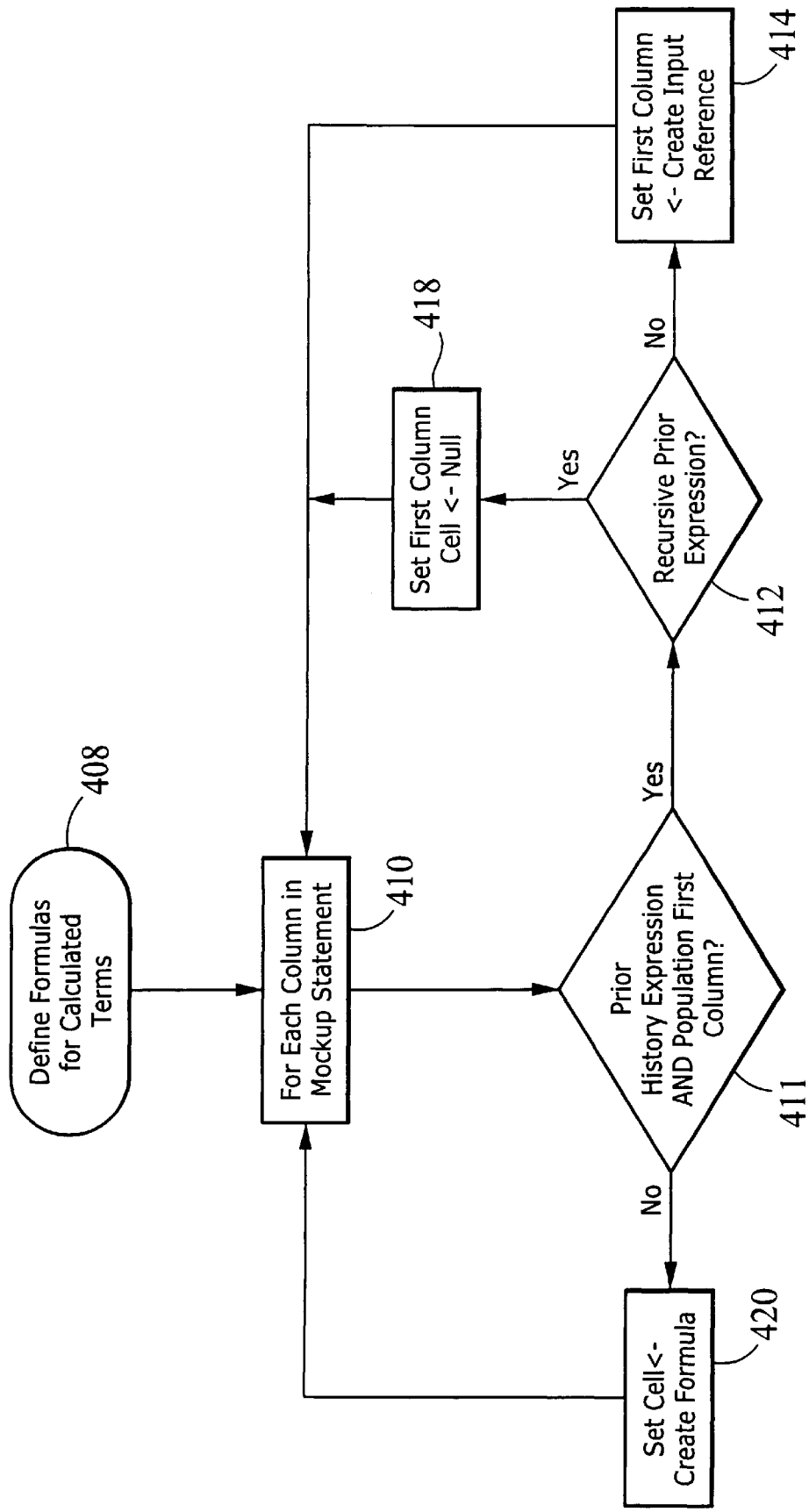

Referring to FIG. 13D, system 22 defines formulas for a calculated term appearing in a row of the mockup financial statement as follows (step 408). For each column in the mockup financial statement, system 22 performs the following steps (step 410). If the first column is being populated and the term's formula includes a recursive prior expression (e.g., x=ƒ(x_prior)) (steps 411 and 412), system 22 creates a reference to the input statement in the first column cell (step 414); if the term's formula includes a prior expression that is not recursive (e.g., y=ƒ(x_prior)), system 22 copies a null value into the first column cell (step 418). If the first column cell does not include a prior expression or the first column is not being populated (step 411), system 22 creates the formula for the term, as defined in financial knowledge base 23 and copies it into the cell (step 420). System 22 then proceeds to the next column in the mockup financial statement (step 410). System 22 creates a formula by substituting the PNAME (ALIAS if one is specified by the user) into the actual formula for the term, as it is defined in financial knowledge base 23. If a calculated term has inputs that do not appear in the mockup financial statement or has a formula with a prior expression, system 22 creates in the formula a reference to the statement and column of the cell containing the appropriate input value.

System 22 does not insert into the input statement terms that are referenced as secondary references on one or more financial statements. With respect to formula creation, system 22 creates references back to the primary reference.

OTHER FEATURES

As mentioned above, overwriting a term name assigns an alias to a predefined term contained within financial knowledge base 23. A user may also extend the dictionary of financial terms in financial knowledge base 23 and give formula definitions to new terms by example. For example, a user-defined term and an associated formula may be inserted into a financial section of a mockup financial statement, and system 22 can be directed to add the user-defined formula to financial knowledge base 23. System 22 prompts the user to indicate whether the added term should be added to the dictionary section corresponding to the section in which the term appears in the mockup financial statement. If not, system 22 prompts the user to identify the section to which the term should be added, or whether a new user-defined statement template should be created. A user can also override a predefined formula. The user is prompted to indicate whether the existing term is to be converted into a new term (i.e., the new term will be used only where the user references the term) or whether the built-in term is to be redefined. System 22 shows in blue user-defined terms and terms with redefined formulas. For example, if a user redefined the net revenue term, system 22 displays in blue all cells with values derived from built-in formulas that depend on net revenue.

The mockup financial statement shown in FIG. 2 displays financial information as a matrix of rows of financial terms and columns of time periods. Financial reports can be constructed in other ways. In one arrangement, a financial report presents financial information as a matrix of rows of contexts and columns of financial terms; this is useful when there is to be one report for each time period. For example, a financial report for a database of assets can show unit price, number of units, value, change, percentage ownership, and tax liability. In another arrangement, a financial report presents financial information as a matrix of rows of periods and columns of financial terms; this is useful when there is to be one report for each context. For example, a financial report for a projection of liabilities, such as a mortgage payment calculation, can show balance, payment, and interest per period for each of a number of properties.

In sum, a novel toolkit for creating and editing reports has been described. The toolkit includes a knowledge base with a dictionary of domain-specific terms, which can be selected by a user to create and edit a report. The toolkit can also assemble predefined reports that can be customized with one or more editing tools. The toolkit can be used to help frame, formulate, and interpret an analysis for common business purposes. In the implementation described, the toolkit manages electronic spreadsheets using a knowledge base that represents how terms in domain-specific reports (i.e., financial statements) are related. This toolkit enhances an Excel spreadsheet by managing information and models and providing an interface between spreadsheets (cell and formulas) and databases (inputs). The toolkit provides a library of reusable components (objects) that contains definitions of numeric calculations in terms of business, organization, product, geographic, and time relations. The toolkit allows a user to easily create a standardized report based upon a predefined template or to create an arbitrary, syntactically and semantically correct report from the terms contained within the built-in dictionary, which may be customized with user synonyms. The toolkit also creates an input spreadsheet that can be used to link all non-calculated cells appearing in a report to a user-supplied database. The input spreadsheet readily allows a user to perform what-if analyses.

Appendix: KBProps

| | A | B | C | D | E | F | G | H |
|---|---|---|---|---|---|---|---|---|
| | | ISA | PNAME | PARTOF | ACTUALFORMULA | SECTIONHEADER | NAMEFORMAT | LINEFORMAT |
| 1 | KBATOM | | | | | | | |
| 2 | ISA | RELATION | | | | | | |
| 3 | PNAME | RELATION | | | | | | |
| 4 | PARTOF | RELATION | | | | | | |
| 5 | ACTUALFORMULA | RELATION | | | | | | |
| 6 | SECTIONHEADER | RELATION | | | | | | |
| 7 | NAMEFORMAT | RELATION | | | | | | |
| 8 | LINEFORMAT | RELATION | | | | | | |
| 9 | RELATION | DESCRIPTION | | | | | | |
| 10 | INSTANCE | DESCRIPTION | | | | | | |
| 11 | TYPE | DESCRIPTION | | | | | | |
| 12 | ATTRIBUTE | DESCRIPTION | | | | | | |
| 13 | CONTEXT | DESCRIPTION | | | | | | |
| 14 | Investing | TRANSACTION | | | | | | |
| 15 | Operating | TRANSACTION | | | | | | |
| 16 | Financing | TRANSACTION | | | | | | |
| 17 | TRANSACTION | DESCRIPTION | | | | | | |
| 18 | ORGANIZATION_CATEGORIES | ORDER | ORGANIZATION CATEGORIES | | | | | |
| 19 | LOCATION_CATEGORIES | ORDER | LOCATION CATEGORIES | | | | | |
| 20 | PRODUCT_CATEGORIES | ORDER | PRODUCT CATEGORIES | | | | | |
| 21 | ORDER | HIERARCHICAL_COMPOSITE | | | | | | |
| 22 | STATEMENT | HIERARCHICAL_COMPOSITE | | | | | | |
| 23 | SECTION | HIERARCHICAL_COMPOSITE | | | | | | |
| 24 | TOTAL | HIERARCHICAL_COMPOSITE | | | | | | |
| 25 | HIERARCHICAL_COMPOSITE | DESCRIPTION | HIERARCHICAL COMPOSITE | | | | | |
| 26 | Date_Expression | TIME_EXPRESSION | Date Expression | | | | | |
| 27 | January | MONTH_EXPRESSION | | | | | | |
| 28 | February | MONTH_EXPRESSION | | | | | | |
| 29 | March | MONTH_EXPRESSION | | | | | | |
| 30 | April | MONTH_EXPRESSION | | | | | | |
| 31 | May | MONTH_EXPRESSION | | | | | | |

| | A | B | C | D |
|---|---|---|---|---|
| 32 | June | MONTH_EXPRESSION | | |
| 33 | July | MONTH_EXPRESSION | | |
| 34 | August | MONTH_EXPRESSION | | |
| 35 | September | MONTH_EXPRESSION | | |
| 36 | October | MONTH_EXPRESSION | | |
| 37 | November | MONTH_EXPRESSION | | |
| 38 | December | MONTH_EXPRESSION | | |
| 39 | MONTH_EXPRESSION | TIME_PERIOD_EXPRESSION | MONTH EXPRESSION | YEAR |
| 40 | First_Quarter | QUARTER_EXPRESSION | 1st Quarter | |
| 41 | Second_Quarter | QUARTER_EXPRESSION | 2nd Quarter | |
| 42 | Third_Quarter | QUARTER_EXPRESSION | 3rd Quarter | |
| 43 | Fourth_Quarter | QUARTER_EXPRESSION | 4th Quarter | |
| 44 | QUARTER_EXPRESSION | TIME_PERIOD_EXPRESSION | QUARTER EXPRESSION | YEAR |
| 45 | Month_Year_Range_Expression | TIME_RANGE_EXPRESSION | Month Year Range Expression | |
| 46 | Day_Year_Range_Expression | TIME_RANGE_EXPRESSION | Day Year Range Expression | |
| 47 | Multiple_Year_Range_Expression | TIME_RANGE_EXPRESSION | Multiple Year Range Expression | |
| 48 | Decade_Range_Expression | TIME_RANGE_EXPRESSION | Decade Range Expression | |
| 49 | Annual | PERIOD_UNIT_EXPRESSION | | |
| 50 | Year | PERIOD_UNIT_EXPRESSION | | YEAR |
| 51 | Quarter | PERIOD_UNIT_EXPRESSION | | QUARTER |
| 52 | Month | PERIOD_UNIT_EXPRESSION | | MONTH |
| 53 | Week | PERIOD_UNIT_EXPRESSION | | |
| 54 | PERIOD_UNIT_EXPRESSION | TIME_RANGE_EXPRESSION | PERIOD UNIT EXPRESSION | |
| 55 | TIME_RANGE_EXPRESSION | TIME_PERIOD_EXPRESSION | TIME RANGE EXPRESSION | |

| | A | B | C | D | E | F | G | H |
|---|---|---|---|---|---|---|---|---|
| 56 | Year_Expression | TIME_PERIOD_EXPRESSION | Year Expression | | | | | |
| 57 | TIME_PERIOD_EXPRESSION | TIME_EXPRESSION | TIME PERIOD EXPRESSION | | | | | |
| 58 | TIME_EXPRESSION | ARITHMETIC_EXPRESSION | TIME EXPRESSION | | | | | |
| 59 | Total_Expression | FINANCIAL_EXPRESSION | Total Expression | | (SUM SUBPARTS) | | | |
| 60 | Net_Expression | FINANCIAL_EXPRESSION | Net Expression | | | | | |
| 61 | Ratio_Expression | FINANCIAL_EXPRESSION | Ratio Expression | | | | | |
| 62 | Rate_Expression | ARITHMETIC_EXPRESSION | Rate Expression | | | | | |
| 63 | Primitive_Financial_Term | FINANCIAL_EXPRESSION | Primitive Financial Term | | | | | |
| 64 | Product_Expression | ARITHMETIC_EXPRESSION | Product Expression | | | | | |
| 65 | FINANCIAL_EXPRESSION | DESCRIPTION | FINANCIAL EXPRESSION | | | | | |
| 66 | ARITHMETIC_EXPRESSION | | | | | | | |
| 67 | Gross_Sales | TYPE | Gross sales | SALES_SECTION | | | | |
| 68 | Unit_Sales | TYPE | Unit sales | | | | | |
| 69 | Unit_Price | TYPE | Unit price | SALES_SECTION | | | | |
| 70 | Discounts | TYPE | | | | | | |
| 71 | Discounts_Rate | Rate_Expression | | SALES_SECTION | | | | |
| 72 | Allowances | TYPE | | | | | | |
| 73 | Allowances_Rate | Rate_Expression | | SALES_SECTION | | | | |
| 74 | Returns | TYPE | | | | | | |
| 75 | Returns_Rate | Rate_Expression | | | | | | |
| 76 | Net_Sales | Net_Expression | Net sales | SALES_SECTION | Gross_Sales − (Discounts + Allowances + Returns) | | greyshade | skipafter |
| 77 | SALES_SECTION | SECTION | SALES SECTION | INCOME_STATEMENT | | Sales. | | |
| 78 | Cost_of_Sales | TYPE | Cost of sales | INCOME_STATEMENT | | | | |
| 79 | Gross_Profit | Net_Expression | Gross profit | | Net_Sales − Cost_of_Sales | | greyshade | skipafter |
| 80 | Selling_General_and_Administrative | TYPE | Selling, general and administrative | | | | | |
| 81 | Selling_General_and_Administrative_Rate | Rate_Expression | SG and A Rate | | | | | |
| 82 | Research_and_Development | TYPE | Research and development | | | | | |
| 83 | Research_and_Development_Rate | Rate_Expression | R and D Rate | | | | | |
| 84 | Depreciation | TYPE | Depreciation | | | | | |
| 85 | Amortization | TYPE | Amortization | | | | | |

3

| | A | B | C | D | E | F | G | H |
|---|---|---|---|---|---|---|---|---|
| 86 | Other_Operating_Expense | TYPE | Other operating expense | | | | | |
| 87 | Operating_Expenses_TOTAL | Total_Expression | Total operating expenses | COSTS_SECTION | Selling_General_and_Administrative+Research_and_Development+Depreciation + Amortization +Other_Operating_Expense | Operating expenses: | grayshade | skipafter |
| 88 | COSTS_SECTION | SECTION | COSTS SECTION | INCOME_STATEMENT | | | | |
| 89 | Operating_Income | Net_Expression | Operating income | INCOME_SECTION | Gross_Profit - Operating_Expenses_TOTAL | | | |
| 90 | Short_Term_Interest_Income_Rate | Rate_Expression | Short-term interest income Rate | | | | | |
| 91 | Interest_Income | TYPE | Interest income | INCOME_SECTION | | | | |
| 92 | Interest_Expense | TYPE | Interest expense | INCOME_SECTION | | | | |
| 93 | Other_Expense | TYPE | Other expense | INCOME_SECTION | | | | linebelow |
| 94 | Income_Before_Income_Taxes | Net_Expression | Income before income taxes | INCOME_SECTION | Operating_Income-(Interest_Income+Interest_Expense+Other_Expense) | | | |
| 95 | Tax_Rate | Rate_Expression | Tax rate | | | | | |
| 96 | Provision_for_Income_Taxes | TYPE | Provision for income taxes | INCOME_SECTION | | | | |
| 97 | Income_Before_Cumulative_Effect_of_Accounting_Changes | Net_Expression | Income before cumulative effect of accounting changes | INCOME_SECTION | Income_Before_Income_Taxes - Provision_for_Income_Taxes | | | |
| 98 | Cumulative_Effect_of_Accounting_Changes | TYPE | Cumulative effect of accounting changes | INCOME_SECTION | | | | |
| 99 | Net_Income | Net_Expression | Net Income | INCOME_SECTION CASH_FLOW_STATEMENT | Income_Before_Cumulative_Effect_of_Accounting_Changes-Cumulative_Effect_of_Accounting_Changes | | grayshade | dblinebelow skipafter |
| 100 | INCOME_SECTION | SECTION | INCOME SECTION | INCOME_STATEMENT | | | | |
| 101 | Preferred_Dividends | TYPE | Preferred dividends | DIVIDENDS_SECTION | | | | |
| 102 | Income_Available_for_Common_Dividends | Net_Expression | Income available for common dividends | DIVIDENDS_SECTION | Net_Income-Preferred_Dividends | | | |
| 103 | Common_Dividend_Payout_Rate | Rate_Expression | Common dividend payout rate | | | | | |
| 104 | Common_Dividends | TYPE | Common dividends | DIVIDENDS_SECTION | | | | |
| 105 | Common_Dividends_Per_Share | Ratio_Expression | Common dividends per share | DIVIDENDS_SECTION | Common_Dividends / Common_Shares_Outstanding_Primary | | | |

| | A | B | C | D | E | F | G | H |
|---|---|---|---|---|---|---|---|---|
| 106 | Earnings_Per_Share_Primary | Ratio_Expression | Earnings per share - primary | DIVIDENDS_SECTION | Income_Available_for_Common_Dividends / Common_Shares_Outstanding_Primary | | | |
| 107 | Earnings_Per_Share_Fully_Diluted | Ratio_Expression | Earnings per share - fully diluted | DIVIDENDS_SECTION | Income_Available_for_Common_Dividends / Common_Shares_Outstanding_Fully_Diluted | | | |
| 108 | Common_Shares_Outstanding_Primary | TYPE | Common shares outstanding - primary | DIVIDENDS_SECTION | | | | |
| 109 | Common_Shares_Outstanding_Fully_Diluted | TYPE | Common shares outstanding -fully diluted | DIVIDENDS_SECTION | | | | |
| 110 | DIVIDENDS_SECTION | SECTION | DIVIDENDS SECTION | DIVIDENDS_SECTION | | | | |
| 111 | DIVIDENDS_SECTION | SECTION | DIVIDENDS SECTION | INCOME_STATEMENT | | | | |
| 112 | Change_in_Retained_Earnings | Net_Expression | Change in Retained Earnings | | Net_Income - (Common_Dividends + Preferred_Dividends) | | italic | |
| 113 | INCOME_STATEMENT | FINANCIAL_STATEMENT | INCOME STATEMENT | | | | | |
| 114 | Cash | TYPE | Cash | CURRENT_ASSETS_SECTION | | | | |
| 115 | Short_Term_Investments | TYPE | Short-term investments | CURRENT_ASSETS_SECTION | | | | |
| 116 | Accounts_Receivable | TYPE | Accounts receivable | CURRENT_ASSETS_SECTION | | | | |
| 117 | Days_Sales_Outstanding | TYPE | Days Sales Outstanding | | | | | |
| 118 | Finished_Goods | TYPE | Finished goods | CURRENT_ASSETS_SECTION | | | | |
| 119 | Work_In_Process | TYPE | Work In Process | CURRENT_ASSETS_SECTION | | | | |
| 120 | Raw_Materials_And_Supplies | TYPE | Raw materials and supplies | CURRENT_ASSETS_SECTION | Raw_Materials_And_Supplies + Work_In_Process + Finished_Goods | Inventories: | | |
| 121 | Inventories_TOTAL | Total_Expression | Inventories total | CURRENT_ASSETS_SECTION | | | | |
| 122 | Other_Current_Assets | TYPE | Other current assets | CURRENT_ASSETS_SECTION | | | | |
| 123 | Current_Assets_TOTAL | Total_Expression | Total current assets | CURRENT_ASSETS_SECTION | Cash + Short_Term_Investments + Accounts_Receivable + Inventories_TOTAL + Other_Current_Assets | Current assets: | | |
| 124 | CURRENT_ASSETS_SECTION | SECTION | CURRENT ASSETS SECTION | ASSETS_SECTION | | | | |
| 125 | Land | TYPE | Land | | | | | |
| 126 | Buildings | TYPE | Buildings | | | | | |
| 127 | Equipment | TYPE | Equipment | | | | | |
| 128 | Other_Property | TYPE | Other property | | | | | |
| 129 | Gross_Property_Plant_and_Equipment_TOTAL | Total_Expression | Gross property, plant and equipment | ASSETS_SECTION | Land+Buildings+Equipment+Other_Property | | | |
| 130 | Accumulated_Depreciation_And_Amortization | TYPE | Accumulated depreciation and amortization | ASSETS_SECTION | | | grayshade | skipafter |

| | A | B | C | D | E | F | G | H |
|---|---|---|---|---|---|---|---|---|
| 131 | Net_Property_Plant_and_Equipment | Net_Expression | Net property, plant and equipment | | Gross_Property_Plant_and_Equipment_TOTAL - Accumulated_Depreciation_And_Amortization | | | |
| 132 | Other_Assets | TYPE | Other assets | | | | | linebelow |
| 133 | ASSETS_TOTAL | Total_Expression | Total assets | ASSETS_SECTION | Current_Assets_TOTAL + Net_Property_Plant_and_Equipment + Other_Assets | | grayshade | dblnebelow skipafter |
| 134 | ASSETS_SECTION | SECTION | Assets section | ASSETS_SECTION BALANCE_SHEET | | Assets | | |
| 135 | Short_Term_Debt | TYPE | Short-term debt | CURRENT_LIABILITIES_SECTION | | | | |
| 136 | Accounts_Payable_Rate | Rate_Expression | Accounts payable rate | | | | | |
| 137 | Accounts_Payable | TYPE | Accounts payable | CURRENT_LIABILITIES_SECTION | | | | |
| 138 | Other_Current_Liabilities | TYPE | Other current liabilities | CURRENT_LIABILITIES_SECTION | | | | |
| 139 | Current_Portion_Of_Long_term_Debt | TYPE | Current portion of long-term debt | CURRENT_LIABILITIES_SECTION | | | | |
| 140 | Current_Liabilities_TOTAL | Total_Expression | Total current liabilities | CURRENT_LIABILITIES_SECTION | Short_term_Debt + Accounts_Payable + Other_Current_Liabilities + Current_Portion_Of_Long_term_Debt | Current liabilities. | grayshade | skipafter |
| 141 | CURRENT_LIABILITIES_SECTION | SECTION | CURRENT LIABILITIES SECTION | LIABILITIES_AND_SHAREHOLDERS_EQUITY_SECTION | | | | |
| 142 | Long_Term_Debt | TYPE | Long-term debt | LONG_TERM_LIABILITIES_SECTION | | | | |
| 143 | Deferred_Income_Taxes | TYPE | Deferred income taxes | LONG_TERM_LIABILITIES_SECTION | | | | |
| 144 | Other_Long_term_Liabilities | TYPE | Other long-term liabilities | LONG_TERM_LIABILITIES_SECTION | | | | skipafter |
| 145 | LONG_TERM_LIABILITIES_SECTION | SECTION | LONG TERM LIABILITIES SECTION | LIABILITIES_AND_SHAREHOLDERS_EQUITY_SECTION | | | | |
| 146 | Minority_Interest | TYPE | Minority interest | LIABILITIES_AND_SHAREHOLDERS_EQUITY_SECTION | | | | skipafter |
| 147 | Preferred_Stock | TYPE | Preferred stock | SHAREHOLDERS_EQUITY_SECTION | | | | |
| 148 | Common_Stock_Issued | TYPE | Common stock issued | SHAREHOLDERS_EQUITY_SECTION | Common_Stock - Common_Stock_prior | | | |
| 149 | Common_Stock | TYPE | Common stock | SHAREHOLDERS_EQUITY_SECTION | | | | |
| 150 | Other_Capital | TYPE | Other capital | SHAREHOLDERS_EQUITY_SECTION | | | | |
| 151 | Retained_Earnings | TYPE | Retained earnings | SHAREHOLDERS_EQUITY_SECTION | | | | |
| 152 | Treasury_Stock_Issued | TYPE | Treasury stock issued | SHAREHOLDERS_EQUITY_SECTION | Treasury_Stock - Treasury_Stock_prior | | | |

| | A | B | C | D | E | F | G | H |
|---|---|---|---|---|---|---|---|---|
| 153 | Treasury_Stock | TYPE | Treasury stock | SHAREHOLDERS_EQUITY_SECTION | | | | |
| 154 | SHAREHOLDERS_EQUITY_TOTAL | Total_Expression | Total shareholders' equity | SHAREHOLDERS_EQUITY_SECTION | Preferred_Stock + Common_Stock + Other_Capital+ Retained_Earnings - Treasury_Stock | Shareholders' equity | grayshade | skipafter |
| 155 | SHAREHOLDERS_EQUITY_SECTION | SECTION | SHAREHOLDERS' EQUITY SECTION | LIABILITIES_AND_SHAREHOLDERS_EQUITY_SECTION | | | | |
| 156 | LIABILITIES_AND_SHAREHOLDERS_EQUITY_SECTION | SECTION | LIABILITIES AND SHAREHOLDERS' EQUITY SECTION | BALANCE_SHEET | | | | |
| 157 | LIABILITIES_TOTAL_AND_SHAREHOLDERS_EQUITY_TOTAL_TOTAL | Total_Expression | Total liabilities and shareholders' equity | BALANCE_SHEET | Current_Liabilities_TOTAL + Long_Term_Debt + Deferred_Income_Taxes + Other_Long_term_Liabilities + Minority_Interest + SHAREHOLDERS_EQUITY_TOTAL | Total liabilities and shareholders' equity | grayshade | dblinebelow_skipafter |
| 158 | Working_Capital | TYPE | Working Capital | BALANCE_SHEET | Current_Assets_TOTAL - Current_Liabilities_TOTAL | | | |
| 159 | Net_Assets | TYPE | Net Assets | BALANCE_SHEET | ASSETS_TOTAL - Current_Liabilities_TOTAL | | | |
| 160 | Capitalization | TYPE | Capitalization | | Net_Assets | | | |
| 161 | BALANCE_SHEET | FINANCIAL_STATEMENT | BALANCE SHEET | | | | | |
| 162 | Depreciation_And_Amortization_TOTAL | Total_Expression | Depreciation and amortization | CASH_FLOW_FROM_OPERATING_ACTIVITIES_SECTION | Depreciation+Amortization | | | |
| 163 | Change_in_deferred_taxes | Net_Expression | Change in deferred taxes | CASH_FLOW_FROM_OPERATING_ACTIVITIES_SECTION | Deferred_Income_Taxes - Deferred_Income_Taxes_prior | | | |
| 164 | Profits_cash_basis | Total_Expression | Profits cash basis | CASH_FLOW_FROM_OPERATING_ACTIVITIES_SECTION | Net_Income + Depreciation_And_Amortization_TOTAL + Change_in_deferred_taxes | | | |
| 165 | Change_in_Accounts_Receivable | Net_Expression | Change in accounts receivable | CASH_FLOW_FROM_OPERATING_ACTIVITIES_SECTION | Accounts_Receivable_prior - Accounts_Receivable | | | |
| 166 | Change_in_Inventories | Net_Expression | Change in inventories | CASH_FLOW_FROM_OPERATING_ACTIVITIES_SECTION | Inventories_TOTAL_prior - Inventories_TOTAL | | | |
| 167 | Change_in_Other_Current_Assets | Net_Expression | Change in other current assets | CASH_FLOW_FROM_OPERATING_ACTIVITIES_SECTION | Other_Current_Assets_prior - Other_Current_Assets | | | |
| 168 | Change_in_Current_Assets_adjusted_TOTAL | Total_Expression | Change in current assets adjusted TOTAL | CASH_FLOW_FROM_OPERATING_ACTIVITIES_SECTION | Change_in_Accounts_Receivable + Change_in_Inventories + Change_in_Other_Current_Assets | | | |
| 169 | Change_in_Accounts_Payable | Net_Expression | Change in accounts payable | CASH_FLOW_FROM_OPERATING_ACTIVITIES_SECTION | Accounts_Payable - Accounts_Payable_prior | | | |
| 170 | Change_in_Income_Taxes_Payable | Net_Expression | Change in income taxes payable | CASH_FLOW_FROM_OPERATING_ACTIVITIES_SECTION | Income_Taxes_Payable - Income_Taxes_Payable_prior | | | |

| | A | B | C | D | E | F | G | H |
|---|---|---|---|---|---|---|---|---|
| 171 | Change_in_Other_Current_Liabilities | Net_Expression | Change in other current liabilities | CASH_FLOW_FROM_OPERATING_ACTIVITIES_SECTION | Other_Current_Liabilities - Other_Current_Liabilities_prior | | | |
| 172 | Change_in_Current_Liabilities_adjusted_TOTAL | Total_Expression | Change in current liabilities adjusted TOTAL | CASH_FLOW_FROM_OPERATING_ACTIVITIES_SECTION | Change_In_Accounts_Payable + Change_in_Other_Current_Liabilities | | | |
| 173 | Change_in_Working_Capital_adjusted_TOTAL | Total_Expression | Change in Working Capital | CASH_FLOW_FROM_OPERATING_ACTIVITIES_SECTION | Change_in_Current_Liabilities_adjusted_TOTAL - Change_in_Current_Assets_adjusted_TOTAL | | | |
| 174 | Other_Operating_Activities | TYPE | Other Operating Activities | CASH_FLOW_FROM_OPERATING_ACTIVITIES_SECTION | | | | |
| 175 | Net_Cash_Provided_by_Operating_ACtivities_TOTAL | Total_Expression | Net cash provided by operating activities | CASH_FLOW_FROM_OPERATING_ACTIVITIES_SECTION | Profits_cash_basis - Change_in_Working_Capital_adjusted_TOTAL+Other_Operating_A ctivities | Cash flow from operating activities: | greyshade | skipafter |
| 176 | CASH_FLOW_FROM_OPERATING_ACTIVITIES_SECTION | SECTION | Cash flow from operating activities | CASH_FLOW_STATEMENT | | | | |
| 177 | Capital_Expenditures | TYPE | Capital Expenditures | CASH_FLOW_FROM_INVESTING_ACTIVITIES_SECTION | | | | |
| 178 | Acquisitions | TYPE | Acquisitions | CASH_FLOW_FROM_INVESTING_ACTIVITIES_SECTION | | | | |
| 179 | Dispositions | TYPE | Dispositions | CASH_FLOW_FROM_INVESTING_ACTIVITIES_SECTION | | | | |
| 180 | Change_In_Short_Term_Investments | TYPE | Change in short-term investments | CASH_FLOW_FROM_INVESTING_ACTIVITIES_SECTION | Short_Term_Investments - Short_Term_Investments_prior | | | |
| 181 | Other_Investing_Activities | TYPE | Other investing activities | CASH_FLOW_FROM_INVESTING_ACTIVITIES_SECTION | (Other_Assets - Other_Assets_prior) | | | |
| 182 | Net_Cash_Used_For_Investing_Activities_TOTAL | Total_Expression | Net cash used for investing activities | CASH_FLOW_FROM_INVESTING_ACTIVITIES_SECTION | Capital_Expenditures + Acquisitions - Dispositions + Change_in_Short_Term_Investments + Other_Investing_Activities | Cash flow from investing activities: | greyshade | skipafter |
| 183 | CASH_FLOW_FROM_INVESTING_ACTIVITIES_SECTION | SECTION | Cash flow from investing activities | CASH_FLOW_STATEMENT | | | | |
| 184 | Change_in_Short_Term_Debt | TYPE | Change in short-term debt | CASH_FLOW_FROM_FINANCING_ACTIVITIES | Short_Term_Debt - Short_Term_Debt_prior | | | |
| 185 | Proceeds_From_Long_Term_Debt | TYPE | Proceeds from long-term debt | CASH_FLOW_FROM_FINANCING_ACTIVITIES | Long_Term_Debt - Long_Term_Debt_prior + Current_Portion_Long_Term_debt | | | |

| | A | B | C | D | E | F | G | H |
|---|---|---|---|---|---|---|---|---|
| 186 | Repayment_of_Long_term_Debt | TYPE | Repayment of long-term debt | CASH_FLOW_FROM_FINANCING_ACTIVITIES | Current_Portion_Long_Term_Debt_prior | | | |
| 187 | Change_in_Debt_TOTAL | Total_Expression | Change in debt TOTAL | CASH_FLOW_FROM_FINANCING_ACTIVITIES | Proceeds_From_Long_Term_Debt + Repayment_of_Long_Term_Debt + Change_in_Short_Term_Debt | | | |
| 188 | Change_in_Minority_Interest | TYPE | Change in Minority Interest | CASH_FLOW_FROM_FINANCING_ACTIVITIES | Minority_Interest - Minority_Interest_prior | | | |
| 189 | Preferred_Dividends_FUNDSFLOW | TYPE | Preferred dividends (FF) | CASH_FLOW_FROM_FINANCING_ACTIVITIES | Preferred_Dividends | | | |
| 190 | Common_Dividends_FUNDSFLOW | TYPE | Common dividends (FF) | CASH_FLOW_FROM_FINANCING_ACTIVITIES | Common_Dividends | | | |
| 191 | Payment_of_Dividends_TOTAL | Total_Expression | Payment of dividends | CASH_FLOW_FROM_FINANCING_ACTIVITIES | -(Preferred_Dividends + Common_Dividends) | | | |
| 192 | Change_in_Preferred_Stock | Net_Expression | Change in preferred stock | CASH_FLOW_FROM_FINANCING_ACTIVITIES | Preferred_Stock - Preferred_Stock_prior | | | |
| 193 | Change_In_Common_Stock | Net_Expression | Change in common stock | CASH_FLOW_FROM_FINANCING_ACTIVITIES | Common_Stock - Common_Stock_prior + Other_Capital - Other_Capital_prior | | | |
| 194 | Change_in_Equity_TOTAL | Total_Expression | Change in stock | CASH_FLOW_FROM_FINANCING_ACTIVITIES | Change_in_Preferred_Stock + Change_in_Common_Stock | | | |
| 195 | Other_Financing_Activities | Net_Expression | Other financing activities | CASH_FLOW_FROM_FINANCING_ACTIVITIES | Other_Long_Term_Liabilities - Other_Long_Term_Liabilities_prior | | | |
| 196 | Net_Cash_Provided_By_Financing_Activities_TOTAL | Total_Expression | Net cash provided by financing activities | CASH_FLOW_FROM_FINANCING_ACTIVITIES | Change_in_Debt_TOTAL + Change_in_Equity_TOTAL + Dividends_TOTAL + Other_Financing_Activities | *Cash flow from financing activities:* | | |
| 197 | CASH_FLOW_FROM_FINANCING_ACTIVITIES | SECTION | Cash flow from financing activities | CASH_FLOW_STATEMENT | | | grayshade | skipafter |
| 198 | Change_in_Cash_TOTAL | Total_Expression | Change in cash | CASH_SECTION | Net_Cash_Provided_By_Operating_Activities_TOTAL + Net_Cash_Used_For_Investing_Activities_TOTAL + Net_Cash_Provided_By_Financing_Activities_TOTAL | | | |
| 199 | Beginning_Cash | TYPE | Beginning cash | CASH_SECTION | | | | |

|   | A | B | C | D | E | F | G | H |
|---|---|---|---|---|---|---|---|---|
| 200 | Ending_Cash | TYPE | Ending cash | CASH_SECTION | | | | |
| 201 | CASH_SECTION | SECTION | CASH_SECTION | CASH_FLOW_STATEMENT | | | grayshade | dblinebelow_skipafter |
| 202 | CASH_FLOW_STATEMENT | FINANCIAL_STATEMENT | CASH FLOW STATEMENT | | | | | |
| 203 | Sales_Growth | TYPE | Sales Growth | Cost_Effectiveness_and_Profitability_SECTION | | | | |
| 204 | Gross_Margin_pct_Sales | Ratio_Expression | Gross Margin % Sales | Cost_Effectiveness_and_Profitability_SECTION | | | | |
| 205 | SG_and_A_pct_Sales | Ratio_Expression | SG&A % Sales | Cost_Effectiveness_and_Profitability_SECTION | | | | |
| 206 | R_and_D_pct_Sales | Ratio_Expression | R & D % Sales | Cost_Effectiveness_and_Profitability_SECTION | | | | |
| 207 | EBIT_pct_Sale | Ratio_Expression | EBIT % Sale | Cost_Effectiveness_and_Profitability_SECTION | | | | |
| 208 | Pretax_ROS_before_Extraordinary_Items | TYPE | Pretax ROS before Extraordinary Items | Cost_Effectiveness_and_Profitability_SECTION | | | | |
| 209 | Cost_Effectiveness_and_Profitability_SECTION | SECTION | Cost Effectiveness & Profitability SECTION | Operating_Measurements_SECTION | | | | |
| 210 | Accounts_Receivable_avg_DSO | TYPE | Accounts Receivable avg DSO | Working_Capital_Management_SECTION | | | | |
| 211 | Inventories_avg_Turnover | TYPE | Inventories avg Turnover | Working_Capital_Management_SECTION | | | | |
| 212 | Accounts_Payable_avg_pct_COGS | Ratio_Expression | Accounts Payable avg % COGS | Working_Capital_Management_SECTION | | | | |
| 213 | Working_Capital_avg_pct_Sales | Ratio_Expression | Working Capital avg % Sales | Working_Capital_Management_SECTION | | | | |
| 214 | Working_Capital_Management_SECTION | SECTION | Working Capital Management SECTION | Operating_Measurements_SECTION | | | | |
| 215 | Operating_Measurements_SECTION | SECTION | Operating Measurements SECTION | RATIOS_STATEMENT | | | | |
| 216 | Capital_Expenditures_pct_Depreciation | Ratio_Expression | Capital Expenditures % Depreciation | New_Capital_Expenditures_SECTION | | | | |
| 217 | New_Capital_Expenditures_SECTION | SECTION | New Capital Expenditures SECTION | Investment_Measurements_SECTION | | | | |
| 218 | Sales_pct_Net_Property_avg | Ratio_Expression | Sales % Net Property avg | Utilization_of_Assets_SECTION | | | | |
| 219 | Sales_pct_Net_Assets_avg | Ratio_Expression | Sales % Net Assets avg | Utilization_of_Assets_SECTION | | | | |
| 220 | RONA_avg_Pretax_before_interest_extraordinary | TYPE | RONA avg Pretax before interest/extraordinary | Utilization_of_Assets_SECTION | | | | |
| 221 | RONA_after_tax_before_interest_extraordinary | TYPE | RONA after tax before interest/extraordinary | Utilization_of_Assets_SECTION | | | | |
| 222 | ROA_avg | TYPE | ROA avg | Utilization_of_Assets_SECTION | | | | |
| 223 | Net_Asset_Growth | TYPE | Net Asset Growth | Utilization_of_Assets_SECTION | | | | |
| 224 | Cash_from_Operations_pct_Net_Assets_avg | Ratio_Expression | Cash from Operations % Net Assets avg | Utilization_of_Assets_SECTION | | | | |

| | A | B | C | D | E | F | G | H |
|---|---|---|---|---|---|---|---|---|
| 225 | Utilization_of_Assets_SECTION | SECTION | Utilization of Assets SECTION | Investment_Measurements_SECTION | | | | |
| 226 | Investment_Measurements_SECTION | SECTION | Investment Measurements SECTION | RATIOS_STATEMENT | | | | |
| 227 | Debt_pct_Capitalization | Ratio_Expression | Debt % Capitalization | Financial_Leverage_SECTION | | | | |
| 228 | Debt_pct_Equity | Ratio_Expression | Debt % Equity | Financial_Leverage_SECTION | | | | |
| 229 | Available_Debt_at_Targeted_Debt_Capitalization | TYPE | Available Debt @ Targeted Debt/Capitalization | Financial_Leverage_SECTION | | | | |
| 230 | Unused_Debt_Capacity_Excess_Debt | TYPE | Unused Debt Capacity (Excess Debt) | Financial_Leverage_SECTION | | | | |
| 231 | Interest_Coverage | TYPE | Interest Coverage | Financial_Leverage_SECTION | | | | |
| 232 | Cost_of_Capital | TYPE | Cost of Capital | Financial_Leverage_SECTION | | | | |
| 233 | Financial_Leverage_SECTION | SECTION | Financial Leverage SECTION | Financing_Measurements_SECTION | | | | |
| 234 | ROE_avg_before_extraordinary | TYPE | ROE avg before extraordinary | Shareholder_Returns_SECTION | | | | |
| 235 | ROE | TYPE | ROE | Shareholder_Returns_SECTION | | | | |
| 236 | Return_on_Common_Equity | TYPE | Return on Common Equity | Shareholder_Returns_SECTION | | | | |
| 237 | Earnings_Per_Share | TYPE | Earnings Per Share | Shareholder_Returns_SECTION | | | | |
| 238 | Common_Dividend_Payout_Income_Available | TYPE | Common Dividend Payout % Income Available | Shareholder_Returns_SECTION | | | | |
| 239 | Shareholder_Returns_SECTION | SECTION | Shareholder Returns SECTION | Financing_Measurements_SECTION | | | | |
| 240 | Financing_Measurements_SECTION | SECTION | Financing Measurements SECTION | RATIOS_STATEMENT | | | | |
| 241 | RATIOS_STATEMENT | FINANCIAL_STATEMENT | RATIOS STATEMENT | | | | | |
| 242 | FINANCIAL_STATEMENT | DOCUMENT | FINANCIAL STATEMENT | | | | | |
| 243 | Other_Report_Documents | DOCUMENT | Other Report Documents | | | | | |
| 244 | DOCUMENT | DESCRIPTION | | | | | | |
| 245 | CELL_OBJECTS | SCHEMA | CELL OBJECTS | | | | | |
| 246 | VIEWS | SCHEMA | | | | | | |
| 247 | SCHEMA | DESCRIPTION | | | | | | |
| 248 | DESCRIPTION | ROOT | | | | | | |

The present invention has been described in terms of specific embodiments. The invention, however, is not limited to these specific embodiments, and other embodiments are within the scope of the claims.

What is claimed is:

1. A method of processing a financial spreadsheet containing one or more financial terms, comprising:

opening an electronic spreadsheet;

providing a financial knowledge base containing a set of financial terms with one or more predefined properties including part-of properties relating financial terms to each other;

receiving a user selection of a financial term contained in the financial knowledge base, the user-selected financial term having one or more predefined properties defined in the financial knowledge base; and receiving a user request to insert the user-selected financial term into the spreadsheet and, in response, automatically inserting into the spreadsheet the user-selected financial term and one or more financial terms defined by the financial knowledge base as being related to the user-selected financial term.

2. The method of claim 1 further comprising:

providing one or more tools for manipulating terms contained in the electronic spreadsheet; and maintaining consistency of the manipulated terms in accordance with the properties associated with the manipulated terms and in accordance with relevant interrelationships defined in the knowledge base, the relevant interrelationships being between the terms in the electronic spreadsheet including the manipulated terms.

3. The method of claim 1 further comprising changing the electronic spreadsheet in accordance with the one or more properties of a second user-selected financial term in response to a user action calling for a change in the electronic spreadsheet relating to the second user-selected financial term.

4. The method of claim 3 further comprising substituting a user-defined alias for a predefined financial term name defined in the financial knowledge base, and further comprising recording an alias for the inserted financial term in response to user action.

5. The method of claim 3 wherein changing the spreadsheet comprises duplicating the second user-selected financial term in response to a user action, wherein a user-defined duplicate financial term is inserted into the spreadsheet and the sum of the duplicated financial term and the user-defined duplicate financial term is substituted in spreadsheet equations where the duplicated financial term appeared before being duplicated.

6. The method of claim 3 wherein changing the spreadsheet comprises itemizing the second user-selected financial term in response to a user action, wherein the second user-selected financial term is converted into a total expression associated with a value derived from one or more user-defined financial terms.

7. The method of claim 6 further comprising inserting into the spreadsheet the one or more user-defined inputs from which the value associated with the itemized financial term is derived.

8. The method of claim 1 wherein the user-selected financial term is a financial section header and the related financial terms are defined by the financial knowledge base as being part of a financial section labeled with the financial section header.

9. The method of claim 1 wherein the user-selected financial term is a calculated term defined by the financial knowledge base as being associated with a value derived from values associated with the related financial terms.

10. The method of claim 9 further comprising converting the user-selected calculated term into an input term that is associated with a value obtained from an input sheet.

11. The method of claim 10 further comprising re-converting the input term back into the calculated term defined by the financial knowledge base as being associated with a value derived from values associated with the related financial terms.

12. The method of claim 1 wherein the user-selected financial term is a total expression and the related financial terms are defined by the knowledge base as being inputs to a spreadsheet formula associated with the user-selected financial term for deriving a value for the total expression.

13. The method of claim 1 wherein imposing constraints comprises preventing a user from deleting certain financial terms from the spreadsheet.

14. The method of claim 13 further comprising preventing a user from deleting from the spreadsheet a calculated financial term used in a spreadsheet formula associated with another financial term in the spreadsheet.

15. The method of claim 13 further comprising preventing a user from deleting from the spreadsheet an itemized financial term associated with a spreadsheet formula summing together one or more user-defined itemization financial terms in the spreadsheet.

16. The method of claim 1 further comprising maintaining a stored representation of the spreadsheet including a record of user actions changing one or more predefined properties of terms inserted into the spreadsheet for the definitions of the terms contained in the knowledge base.

17. The method of claim 16 further comprising updating the stored representation of the spreadsheet in response to a user action deleting a term from the spreadsheet.

18. The method of claim 17 wherein updating the stored representation comprises updating an itemization count associated with an itemized financial term in response to a deletion of an itemization of the itemized financial term.

19. The method of claim 17 wherein updating the stored representation comprises updating duplicate count associated with a duplicated financial term in response to a deletion of a duplicate of the duplicated financial term.

20. The method of claim 1 further comprising deleting from the spreadsheet a calculated financial term which has no direct dependents on the spreadsheet in response to a user action, and deleting from the spreadsheet financial terms referenced in a spreadsheet formula for the deleted calculated term.

21. The method of claim 20 wherein a calculated term, which has no direct dependents on the spreadsheet, is referenced in the spreadsheet formula for the deleted calculated term, and further comprising deleting from the spreadsheet the referenced calculated term and deleting from the spreadsheet financial terms referenced in a spreadsheet formula for the referenced calculated term.

22. The method of claim 1 further comprising characterizing a financial term as either an input term or a calculated term, and further comprising recording a user-requested change in the predefined status property from an input term to a calculated term or from a calculated term to an input term.

23. The method of claim 1 further comprising:

opening a second electronic spreadsheet; and inserting into the second spreadsheet all of the financial terms needed to populate the first spreadsheet with values.

24. The method of claim 23 further comprising deleting from the second spreadsheet financial terms not needed to populate the first spreadsheet as a result of user changes to the first spreadsheet.

25. The method of claim 23 further comprising populating the second spreadsheet with values obtained from a database.

26. The method of claim 1 further comprising populating the spreadsheet with formulas for deriving values for financial terms contained in the spreadsheet.

27. The method of claim 26 wherein populating the spreadsheet with formulas comprises obtaining predefined formulas for calculated terms from the financial knowledge base.

28. The method of claim 27 further comprising substituting into the predefined formulas obtained from the financial knowledge base user-defined aliases for one or more terms appearing in the spreadsheet.

29. The method of claim 1 further comprising displaying the properties associated with one or more terms contained within the electronic spreadsheet.

30. The method of claim 1, further comprising:
   imposing constraints on user manipulation of the spreadsheet with respect to the user-selected financial term in accordance with the one or more identified predefined properties of the user-selected financial term.

31. The method of claim 1, further comprising:
   changing the spreadsheet in accordance with the one or more properties of the user-selected financial term in response to a user action calling for a change in the spreadsheet relating to the user-selected financial term.

32. A method of processing a financial spreadsheet containing one or more financial terms, comprising:
   opening an electronic spreadsheet;
   providing a financial knowledge base containing a set of financial terms with one or more predefined properties including part-of properties relating financial terms to each other;
   imposing constraints on user manipulation of the spreadsheet with respect to the financial terms in the set in accordance with the one or more identified predefined properties associated with the financial terms; and
   receiving a user action substituting a user-defined alias for a predefined financial term name defined in the financial knowledge base and recording an alias for the inserted financial term in response to user action.

33. A method of processing a financial spreadsheet containing one or more financial terms, comprising:
   opening an electronic spreadsheet;
   providing a financial knowledge base containing a set of financial terms with one or more predefined properties including part-of properties relating financial terms to each other;
   imposing constraints on user manipulation of the spreadsheet with respect to the financial terms in the set in accordance with the one or more identified predefined properties associated with the financial terms; and
   changing the spreadsheet in response to a user action, the changing comprising duplicating a user-selected financial term in response to the user action, wherein a user-defined duplicate financial term is inserted into the spreadsheet and the sum of the duplicated financial term and the user-defined duplicate financial term is substituted in spreadsheet equations where the duplicated financial term appeared before being duplicated.

34. A method of processing a financial spreadsheet containing one or more financial terms, comprising:
   opening an electronic spreadsheet;
   providing a financial knowledge base containing a set of financial terms with one or more predefined properties including part-of properties relating financial terms to each other;
   imposing constraints on user manipulation of the spreadsheet with respect to the financial terms in the set in accordance with the one or more identified predefined properties associated with the financial terms; and
   changing the spreadsheet in response to a user action, the changing comprising itemizing a user-selected financial term in response to a user action, wherein the user-selected financial term is converted into a total expression associated with a value derived from one or more user-defined financial terms.

35. A computer program product, tangibly stored on a computer-readable medium, for processing a financial spreadsheet containing one or more financial terms, the product comprising instructions operable to cause a programmable processor to:
   open an electronic spreadsheet;
   open a financial knowledge base containing a set of financial terms with one or more predefined properties including part-of properties relating financial terms to each other;
   receive a user selection of a financial term contained in the financial knowledge base, the user-selected financial term having one or more predefined properties defined in the financial knowledge base; and
   receive a user request to insert the user-selected financial term into the spreadsheet and, in response, automatically insert into the spreadsheet the user-selected financial term and one or more financial terms defined by the financial knowledge base as being related to the user-selected financial term.

36. The product of claim 35, further comprising instructions to:
   impose constraints on user manipulation of the spreadsheet with respect to the user-selected financial term in accordance with the one or more identified predefined properties of the user-selected financial term.

37. The product of claim 35, further comprising instructions to:
   change the spreadsheet in accordance with the one or more properties of the user-selected financial term in response to a user action calling for a change in the spreadsheet relating to the user-selected financial term.

38. A computer program product, tangibly stored on a computer-readable medium, for processing a financial spreadsheet containing one or more financial terms, the product comprising instructions operable to cause a programmable processor to:
   open an electronic spreadsheet;
   open a financial knowledge base containing a set of financial terms with one or more predefined properties including part-of properties relating financial terms to each other;
   impose constraints on user manipulation of the spreadsheet with respect to the financial terms in the set in accordance with the one or more identified predefined properties associated with the financial terms; and
   receive a user action substituting a user-defined alias for a predefined financial term name defined in the financial knowledge base and record an alias for the inserted financial term in response to user action.

39. A computer program product, tangibly stored on a computer-readable medium, for processing a financial spreadsheet containing one or more financial terms, the product comprising instructions operable to cause a programmable processor to:

open an electronic spreadsheet;

open a financial knowledge base containing a set of financial terms with one or more predefined properties including part-of properties relating financial terms to each other;

impose constraints on user manipulation of the spreadsheet with respect to the financial terms in the set in accordance with the one or more identified predefined properties associated with the financial terms; and change the spreadsheet in response to a user action, the change comprising duplicating a user-selected financial term in response to the user action, wherein a user-defined duplicate financial term is inserted into the spreadsheet and the sum of the duplicated financial term and the user-defined duplicate financial term is substituted in spreadsheet equations where the duplicated financial term appeared before being duplicated.

40. A computer program product, tangibly stored on a computer-readable medium, for processing a financial spreadsheet containing one or more financial terms, the product comprising instructions operable to cause a programmable processor to:

open an electronic spreadsheet;

open a financial knowledge base containing a set of financial terms with one or more predefined properties including part-of properties relating financial terms to each other;

impose constraints on user manipulation of the spreadsheet with respect to the financial terms in the set in accordance with the one or more identified predefined properties associated with the financial terms; and change the spreadsheet in response to a user action, the change comprising itemizing a user-selected financial term in response to a user action, wherein the user-selected financial term is converted into a total expression associated with a value derived from one or more user-defined financial terms.

* * * * *

UNITED STATES PATENT AND TRADEMARK OFFICE
CERTIFICATE OF CORRECTION

PATENT NO. : 6,134,563
DATED : October 17, 2000
INVENTOR(S) : William J. Clancey et al.

It is certified that error appears in the above-identified patent and that said Letters Patent is hereby corrected as shown below:

Title page,
Item [56], References Cited, OTHER PUBLICATIONS, insert the following:

--SPREADWARE, "Supporting Macintosh Spreadsheets," price list, Graham Communications, Hayward, 1989

M. Jaynes, "Here Comes SAP," Fortune, October 2, 1995, pp. 122-124

P. Lyons et al., "AI in Business," Workshop Program, AAAI, San Jose Convention Center, July 12-16, 1992

J. Poultney, "Analytica models business," MacWeek, News Section, p. 6 (September 30, 1996)

"Transactions on Information Systems," acm Press, Vol. 13, No. 1, 1/1995

W. Hamscher, "Model-based reasoning in financial domains," The Knowledge Engineering Review, Vol. 7:4, 1992, pp. 323-343

W. Hamscher, "Model accounting systems to support multiple tasks: A progress report," Price Waterhouse Technology Centre, Menlo Park, pp. 519-524 (1992)

W. Mossberg, "Excel Spreadsheet Is New and Improved, But Hardly Perfect," article (1995)

Ch. Seiter, "Smart Spreadsheets," MACWORLD, August 1993, p. 77

Ch. Seiter, "SpreadBase 1.0.1," MACWORLD, May 1993, p. 144

Special Advertising Supplement, "Better Decisions Mean A Better Bottom Line," CW Custom Publications, Framingham, MA, 10 pgs. (Fall 1995)

"Why use CEO*Plan?," Internet information, 14 pgs. (1995)

"Redefining information access, analysis, and reporting for the Macintosh," Business Objects™, 1995, 5 pgs.

J. Keyes, "AI in the Big Six," AI EXPERT, May 1990, pp. 35-42

C. Brown, "Where 1-2-3 Makes Deals in a Hurry," LOTUS, June 1989, pp. 52-55

Lotus, "The NEXT Lotus spreadsheet is here," Improv Specifications, Cambridge, MA (circa 1991)

M. Falkner, "CFO Advisor Financial Analysis Beyond Spreadsheets," PC Magazine, June 27, 89, pp. 235-243

"Plan to get ahead in business," Palo Alto Software, 1994, 5 pgs.

"Introducing Cashe," Business Matters, Inc., 1995, 7 pgs.

"Would you bet your future on this number?", DecisioNeering, Inc. product information, 1993

UNITED STATES PATENT AND TRADEMARK OFFICE
CERTIFICATE OF CORRECTION

PATENT NO. : 6,134,563
DATED : October 17, 2000
INVENTOR(S) : William J. Clancey et al.

It is certified that error appears in the above-identified patent and that said Letters Patent is hereby corrected as shown below:

T. Foulks, "Of Sharks, LANs, and a Crystal Ball," PC World, Nov. 1993

J. Dawson, "Business-Plan Templates," MACWORLD, June 1995, pg. 61

"Make Me An Offer," Business Valuation, price list, Baarns Publishing (1995)

"Go Free! Go Figure," Advertisement, COMPUSA, (1995)

Advance 1.0 for Windows, Published by Lighten, Website, 8 pgs. (October 5, 1995)

J. Swartz, "New spreadsheet keeps it simple," MacWeek, vol. 10, no. 4 (Jan. 29, 1996)--

Signed and Sealed this

Twenty-seventh Day of May, 2003

JAMES E. ROGAN
*Director of the United States Patent and Trademark Office*